US011905698B2

(12) United States Patent
Reed et al.

(10) Patent No.: US 11,905,698 B2
(45) Date of Patent: Feb. 20, 2024

(54) FEED MECHANISM FOR A DRAIN CLEANER ASSEMBLY

(71) Applicant: MILWAUKEE ELECTRIC TOOL CORPORATION, Brookfield, WI (US)

(72) Inventors: Michael C. Reed, Milwaukee, WI (US); Timothy J. Hilger, Waterford, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 568 days.

(21) Appl. No.: 17/052,658

(22) PCT Filed: Apr. 20, 2020

(86) PCT No.: PCT/US2020/028951

§ 371 (c)(1),
(2) Date: Nov. 3, 2020

(87) PCT Pub. No.: WO2020/215059

PCT Pub. Date: Oct. 22, 2020

(65) Prior Publication Data

US 2021/0277647 A1 Sep. 9, 2021

Related U.S. Application Data

(60) Provisional application No. 62/836,122, filed on Apr. 19, 2019.

(51) Int. Cl.
*E03F 9/00* (2006.01)
*B08B 9/045* (2006.01)

(52) U.S. Cl.
CPC .............. *E03F 9/005* (2013.01); *B08B 9/045* (2013.01)

(58) Field of Classification Search
CPC ................................ E03F 9/005; B08B 9/045
See application file for complete search history.

(56) References Cited

U.S. PATENT DOCUMENTS 2,102,917 A 12/1937 Rolland
2,111,527 A 3/1938 Blanc
(Continued)

FOREIGN PATENT DOCUMENTS

DE 3221245 A1 12/1983
DE 102008015532 B4 8/2014
(Continued)

OTHER PUBLICATIONS

"Dow Corning Molykote 55 Oring Grease 5.3 oz" www.amazon.com, date first available Nov. 9, 2004 (Year: 2004).*
(Continued)

*Primary Examiner* — Laura C Guidotti
(74) *Attorney, Agent, or Firm* — Michael Best & Friedrich LLP

(57) ABSTRACT

A feed mechanism for use with a drain cleaner includes a frame configured to be coupled to the drain cleaner. The frame including a cable passage defining a cable axis. The feed mechanism includes a plurality of rollers including a translatable roller. Each roller defines a roller axis. The translatable roller is moveable between an engaged position and a disengaged position. The feed mechanism includes a mode selection member coupled to the frame and moveable between a first position in which each roller axis is parallel to the cable axis and the plurality of rollers are configured to spin the cable about the cable axis, and a second position in which each roller axis is non-parallel to the cable axis and the plurality of rollers are configured to move the cable in a first direction along the cable axis.

30 Claims, 14 Drawing Sheets

(56) References Cited

U.S. PATENT DOCUMENTS

| | | | |
|---|---|---|---|
| 2,167,268 | A | 7/1939 | Sanger |
| 2,223,005 | A | 11/1940 | Kerber |
| 2,225,129 | A | 12/1940 | Osborn |
| 2,267,493 | A | 12/1941 | Clotz |
| 2,282,600 | A | 5/1942 | Blanc |
| 2,291,253 | A | 7/1942 | Osborn |
| 2,355,733 | A | 8/1944 | Johnson et al. |
| 2,426,265 | A | 8/1947 | Gavin |
| 2,468,490 | A | 4/1949 | Joseph |
| 2,552,808 | A | 5/1951 | O'Brien |
| 2,562,574 | A | 7/1951 | Poekert |
| 2,610,807 | A | 9/1952 | O'Brien |
| 2,730,740 | A | 1/1956 | O'Brien |
| 2,926,372 | A | 3/1960 | O'Brien |
| 2,926,775 | A | 3/1960 | O'Brien |
| 2,953,799 | A | 9/1960 | Arnold |
| 2,955,307 | A | 10/1960 | Hunt |
| 2,960,851 | A | 11/1960 | Ciaccio |
| 3,025,547 | A | 3/1962 | Ciaccio |
| 3,071,794 | A | 1/1963 | Prange |
| 3,075,217 | A | 1/1963 | Kollmann |
| 3,083,391 | A | 4/1963 | Prange |
| 3,086,234 | A | 4/1963 | Crane |
| 3,159,861 | A | 12/1964 | Sarcone |
| 3,162,878 | A | 12/1964 | Agostino |
| 3,176,335 | A | 4/1965 | Ciaccio et al. |
| 3,206,782 | A | 9/1965 | Larsen |
| 3,224,024 | A | 12/1965 | Hunt |
| 3,242,518 | A | 3/1966 | Prange |
| 3,246,354 | A | 4/1966 | Cooney et al. |
| 3,298,051 | A | 1/1967 | Ratliff |
| 3,414,926 | A | 12/1968 | Bloom |
| 3,451,089 | A | 6/1969 | Carlson et al. |
| 3,451,090 | A | 6/1969 | Presti et al. |
| 3,605,158 | A | 9/1971 | Russell |
| 3,747,153 | A | 7/1973 | O'Neill |
| 3,882,565 | A | 5/1975 | Irwin et al. |
| 3,897,602 | A | 8/1975 | Waterbury |
| 3,928,885 | A | 12/1975 | Peterson et al. |
| 3,950,934 | A | 4/1976 | Irwin |
| 3,958,293 | A | 5/1976 | Irwin |
| 3,983,593 | A | 10/1976 | Naeve |
| 4,104,757 | A | 8/1978 | Silverman |
| 4,153,966 | A | 5/1979 | Irwin |
| 4,188,683 | A | 2/1980 | Klunder |
| 4,218,802 | A | 8/1980 | Babb et al. |
| 4,246,802 | A | 1/1981 | Rasmussen et al. |
| 4,266,709 | A | 5/1981 | Kruger |
| 4,284,931 | A | 8/1981 | Ehret |
| 4,290,162 | A | 9/1981 | Agostino |
| 4,364,139 | A | 12/1982 | Babb et al. |
| 4,395,791 | A | 8/1983 | Irwin |
| 4,420,852 | A | 12/1983 | Bowlsby |
| 4,464,806 | A | 8/1984 | Prange |
| 4,570,281 | A | 2/1986 | Boelens |
| 4,580,306 | A | 4/1986 | Irwir |
| 4,611,360 | A | 9/1986 | Irwin |
| 4,686,732 | A | 8/1987 | Irwin |
| 4,700,422 | A | 10/1987 | Russell |
| 4,716,613 | A | 1/1988 | Irwin |
| 4,773,113 | A | 9/1988 | Russell |
| 4,914,775 | A | 4/1990 | Kirk |
| 4,916,772 | A | 4/1990 | Russell et al. |
| 4,956,889 | A | 9/1990 | Kirk |
| 5,029,356 | A | 7/1991 | Silverman et al. |
| 5,031,263 | A | 7/1991 | Babb et al. |
| 5,031,276 | A | 7/1991 | Babb et al. |
| 5,193,242 | A | 3/1993 | Irwin |
| 5,199,129 | A | 4/1993 | Salecker et al. |
| 5,222,270 | A | 6/1993 | Sloter et al. |
| 5,239,724 | A | 8/1993 | Salecker et al. |
| 5,309,595 | A | 5/1994 | Salecker et al. |
| 5,390,389 | A | 2/1995 | Rutkowski et al. |
| 5,507,062 | A | 4/1996 | Salecker |
| 5,636,403 | A | 6/1997 | Grimsley et al. |
| 5,640,736 | A | 6/1997 | Salecker |
| 5,657,505 | A | 8/1997 | Gallagher et al. |
| 5,689,980 | A | 11/1997 | Weinerman et al. |
| 5,862,561 | A | 1/1999 | Irwin |
| 5,901,401 | A | 5/1999 | Rutkowski et al. |
| 5,996,159 | A | 12/1999 | Irwin |
| 6,009,588 | A | 1/2000 | Rutkowski |
| 6,243,905 | B1 | 6/2001 | Rutkowski |
| 6,343,398 | B1 | 2/2002 | Silverman et al. |
| 6,360,397 | B1 | 3/2002 | Babb |
| 6,381,798 | B1 | 5/2002 | Rutkowski et al. |
| 6,412,136 | B1 | 7/2002 | Rutkowski |
| 6,546,582 | B2 | 4/2003 | Silverman |
| 6,594,849 | B1 | 7/2003 | Nimens |
| 6,618,892 | B2 | 9/2003 | Schmitt |
| 6,637,064 | B2 | 10/2003 | Silverman et al. |
| 6,655,228 | B1 | 12/2003 | Margherio et al. |
| 6,760,948 | B2 | 7/2004 | Schmitt |
| 7,073,224 | B2 | 7/2006 | Schmitt |
| 7,222,383 | B2 | 5/2007 | Hale |
| 7,269,874 | B2 | 9/2007 | Hung |
| 7,478,451 | B2 | 1/2009 | Rutkowski et al. |
| 7,676,879 | B1 | 3/2010 | Rutenberg et al. |
| 7,685,669 | B2 | 3/2010 | Rutkowski et al. |
| 7,757,332 | B1 | 7/2010 | Hale |
| 7,810,203 | B2 | 10/2010 | Stoltz |
| 7,889,980 | B2 | 2/2011 | Sooy |
| 7,891,038 | B2 | 2/2011 | Hale |
| 7,935,192 | B2 | 5/2011 | Silverman et al. |
| 8,046,862 | B2 | 11/2011 | Eisermann et al. |
| 8,176,593 | B2 | 5/2012 | Gress et al. |
| 8,413,347 | B2 | 4/2013 | Gress et al. |
| 8,615,837 | B2 | 12/2013 | Hale et al. |
| 8,826,483 | B2 | 9/2014 | Rutkowski et al. |
| 8,931,131 | B1 | 1/2015 | Feduke |
| 9,009,906 | B2 | 4/2015 | Hale et al. |
| 9,015,890 | B1 | 4/2015 | Owens |
| 9,550,649 | B2 | 1/2017 | Zink |
| 10,071,401 | B2 | 9/2018 | Dunkin et al. |
| 10,189,060 | B2 | 1/2019 | Hsu |
| 10,493,901 | B2 | 12/2019 | Schermerhorn et al. |
| 11,285,521 | B2 | 3/2022 | Kehoe et al. |
| 2002/0083538 | A1 | 7/2002 | Silverman et al. |
| 2004/0255415 | A1 | 12/2004 | Silva |
| 2005/0193509 | A1 | 9/2005 | Rutkowski et al. |
| 2007/0033752 | A1 | 2/2007 | Hung |
| 2008/0098544 | A1 | 5/2008 | Rutkowski et al. |
| 2008/0244816 | A1 | 10/2008 | Babb et al. |
| 2009/0211044 | A1 | 8/2009 | Hale et al. |
| 2010/0017981 | A1 | 1/2010 | Hamm et al. |
| 2010/0050350 | A1 | 3/2010 | Babb et al. |
| 2010/0139696 | A1 | 6/2010 | Silverman et al. |
| 2013/0160583 | A1 | 6/2013 | Kai et al. |
| 2014/0230181 | A1 | 8/2014 | Yamaoka et al. |
| 2014/0352464 | A1 | 12/2014 | Zink |
| 2016/0175899 | A1 | 6/2016 | Dunkin et al. |
| 2018/0016776 | A1 | 1/2018 | Stoneback et al. |
| 2018/0057385 | A1 | 3/2018 | Bray, III |

FOREIGN PATENT DOCUMENTS

| | | | |
|---|---|---|---|
| DE | 202008018563 | U1 | 11/2015 |
| EP | 2371462 | B1 | 5/2014 |
| GB | 1118126 | A | 6/1968 |
| JP | H11300305 | A | 11/1999 |
| WO | 2006112847 | A1 | 10/2006 |
| WO | 2006112848 | A1 | 10/2006 |
| WO | 2007008885 | A2 | 1/2007 |
| WO | 2008124230 | A1 | 10/2008 |
| WO | 2016106110 | A1 | 6/2016 |
| WO | 2016141923 | A1 | 9/2016 |

OTHER PUBLICATIONS

International Search Report and Written Opinion for Application No. PCT/US2020/028951 dated Jul. 31, 2020 (15 pages).

(56) References Cited

OTHER PUBLICATIONS

Extended European Search Report for Application No. 20791449.0 dated Jul. 27, 2023 (12 pages).

* cited by examiner

FEED MECHANISM FOR A DRAIN CLEANER ASSEMBLY

CROSS-REFERENCE TO RELATED APPLICATIONS

This application is a national phase filing under 35 U.S.C. 371 of International Application No. PCT/US2020/028951 filed Apr. 20, 2020, which claims priority to U.S. Provisional Patent Application No. 62/836,122 filed on Apr. 19, 2019, the entire content of which is incorporated herein by reference.

FIELD OF THE INVENTION

The present invention relates to drain cleaner assemblies, and more particularly to feed mechanisms for drain cleaner assemblies.

BACKGROUND OF THE INVENTION

Drain cleaners are used to clear clogs and other debris out of drains and other types of conduits. A drain cleaner typically includes an elongated cable that can be inserted into a drain. A feed mechanism may be used to rotate or spin the cable to break up clogs within the drain.

SUMMARY OF THE INVENTION

The present invention provides, in one aspect, a feed mechanism for use with a drain cleaner. The feed mechanism is configured to drive a cable of the drain cleaner. The feed mechanism comprises a frame configured to be coupled to the drain cleaner. The frame includes a cable passage defining a cable axis. The feed mechanism further comprises a plurality of rollers including a translatable roller. Each roller defines a roller axis. The translatable roller is moveable between an engaged position, in which the translatable roller is moved toward the cable axis to engage the cable, and a disengaged position, in which the translatable roller is moved away from the cable axis to be spaced from the cable. The feed mechanism further comprises a mode selection member coupled to the frame and moveable between a first position in which each roller axis is parallel to the cable axis and the plurality of rollers are configured to spin the cable about the cable axis, and a second position in which each roller axis is non-parallel to the cable axis and the plurality of rollers are configured to move the cable in a first direction along the cable axis. When the translatable roller is in the engaged position and the mode selection member is in the first position, the feed mechanism is operable to spin the cable about the cable axis. When the translatable roller is in the engaged position and the mode selection member is in the second position, the feed mechanism is operable to move the cable in the first direction along the cable axis.

The present invention provides, in another aspect, a feed mechanism for use with a drain cleaner. The feed mechanism is configured to drive a cable of the drain cleaner. The feed mechanism comprises a frame configured to be coupled to the drain cleaner. The frame includes a cable passage defining a cable axis. The feed mechanism further comprises a plurality of rollers including a translatable roller. The translatable roller is moveable between an engaged position, in which the translatable roller is moved toward the cable axis to engage the cable, and a disengaged position, in which the translatable roller is moved away from the cable axis to be spaced from the cable. The feed mechanism further comprises an activator supported by the frame and movable between an active position, in which the translatable roller is in the engaged position, and an inactive position, in which the translatable roller is in the disengaged position. The feed mechanism further comprises a plunger coupled for movement with the activator and the translatable roller to move the translatable roller in response to movement of the activator. The feed mechanism further comprises a friction plate arranged about the plunger. The friction plate is operable to frictionally engage the plunger while the activator is in the active position to inhibit the activator from moving to the inactive position.

The present invention provides, in yet another aspect, a feed mechanism for use with a drain cleaner having an extension and a lock aperture. The feed mechanism is configured to drive a cable of the drain cleaner. The feed mechanism comprises a frame configured to be removably coupled to the drain cleaner. The frame includes a rear plate having a rear aperture that defines a cable passage. The rear aperture is configured to receive the extension of the drain cleaner. The feed mechanism further comprises a plurality of rollers configured to selectively engage the cable when the frame is coupled to the drain cleaner. The feed mechanism further comprises a release mechanism including a release housing coupled to the frame and a locking pin supported by the release housing. The locking pin is movable relative to the release housing between a locked position, in which the locking pin engages the lock aperture to secure the feed mechanism to the drain cleaner, and an unlocked position, in which the locking pin disengages the lock aperture to release the feed mechanism from the drain cleaner. The release mechanism further comprises an actuator configured to move the locking pin from the locked position to the unlocked position.

The present invention provides, in yet another aspect, a drain cleaner assembly configured to guide a cable into a drain. The drain cleaning assembly comprises a drain cleaner having the cable and including a mounting plate having an extension defining an opening for the cable. The drain cleaning assembly further comprises a feed mechanism configured to drive the cable. The feed mechanism includes a frame having a rear aperture that defines a cable passage. The rear aperture receives the extension of the mounting plate. The feed mechanism also includes a plurality of rollers configured to selectively engage the cable, and a release mechanism operable to releasably secure the feed mechanism to the mounting plate.

The present invention provides, in yet another aspect, a method of operating a drain cleaner. The drain cleaner includes a drive unit and a drum unit coupled to the drive unit. The drum unit contains a cable and is configured to be rotated by the drive unit. The method comprises attaching a feed mechanism to the drum unit. The feed mechanism includes a frame and a plurality of rollers. The frame has a rear aperture that defines a cable passage. The cable passage receives a portion of the cable therethrough. The plurality of rollers are configured to selectively engage the cable received in the cable passage. The method further comprises operating the drain cleaner assembly by rotating the drum unit with the drive unit and engaging the cable with the plurality of rollers. The method further comprises removing the feed mechanism from the drum unit.

The present invention provides, in yet another aspect, a method of attaching a feed mechanism to a drain cleaner. The drain cleaner includes a mounting plate having an extension and a tang member extending radially outward from the extension. The feed mechanism includes a frame having a rear plate with a rear aperture and an opening extending radially-outward from the rear aperture. The method comprises rotationally aligning the opening of the rear plate with the tang member of the extension, axially receiving the extension of the mounting plate in the rear aperture of the rear plate, rotating the frame about the extension, and receiving a locking pin of the feed mechanism in a lock aperture of the mounting plate.

The present invention provides, in yet another aspect, a system comprising a first drain cleaner including a first drive unit, and a first drum unit coupled to the first drive unit and having a first drum and a first mounting plate. The first drum contains a first cable and is configured to be rotated by the first drive unit. The system further comprises a second drain cleaner including a second drive unit, and a second drum unit coupled to the first drive unit and having a second drum and a second mounting plate. The second drum contains a second cable and is configured to be rotated by the second drive unit. The system further comprises a feed mechanism alternately coupleable to the first mounting plate of the first drain cleaner and the second mounting plate of the second drain cleaner. The feed mechanism is operable to drive the first cable while coupled to the first mounting plate, and is operable to drive the second cable while coupled to the second mounting plate.

Other features and aspects of the invention will become apparent by consideration of the following detailed description and accompanying drawings.

Figure 1:
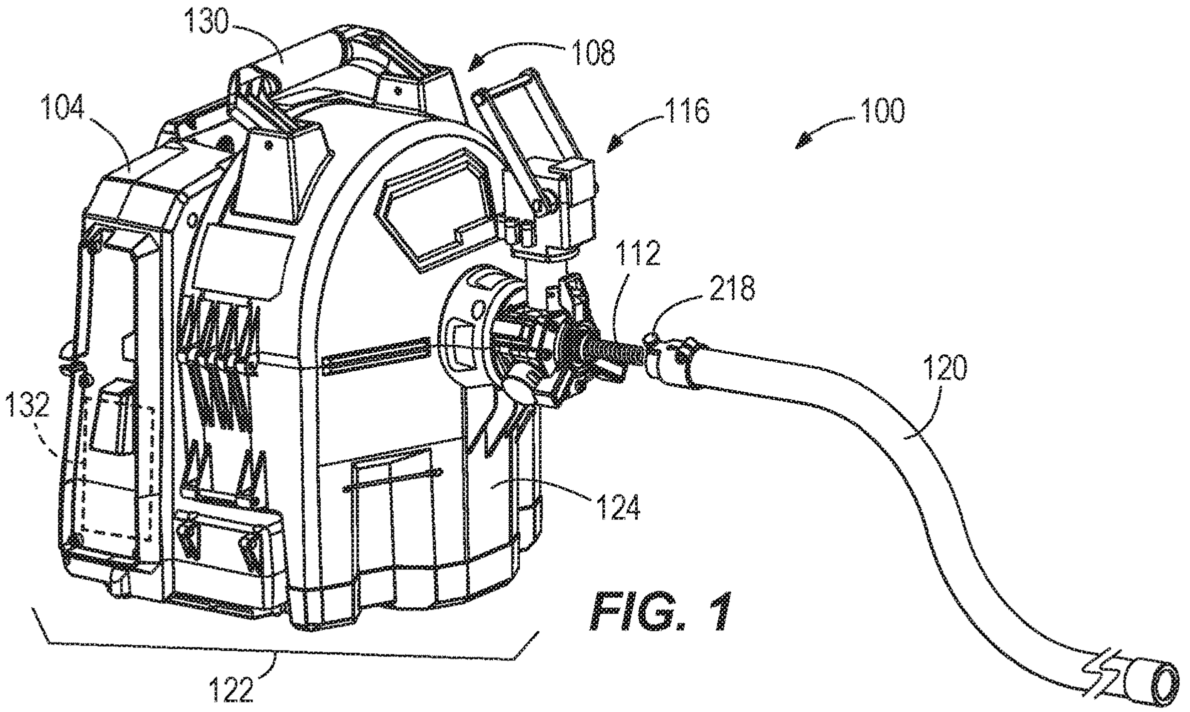
FIG. 1 is perspective view of a drain cleaner assembly.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

As shown in FIGS. 1-5, a drain cleaner assembly 100 includes a drive unit 104 for driving, a drum unit 108 with a flexible snake or cable 112, a feed mechanism 116, and an auxiliary tube 120. In the illustrated embodiment, the drive unit 104 and drum unit 108 collectively comprise one example of a first drain cleaner 122. However, the feed mechanism 116 and auxiliary tube 120 are configured to be used with other types of drain cleaners, including hand-held, free-standing, and/or stationary drain cleaners.

As explained in further detail below, the drum unit 108 is removably coupled to the drive unit 104, the feed mechanism 116 is removably coupled to the drum unit 108, and the auxiliary tube 120 is removably coupled to the feed mechanism 116. As shown in FIGS. 1-5, the drum unit 108 includes an outer housing 124 and an inner drum 128 that is rotatable relative to the outer housing 124, as explained in further detail below. The outer housing 124 includes a handle 130 and the inner drum 128 holds the cable 112, though the cable 112 has been omitted from FIG. 4 for clarity.

Figure 2:
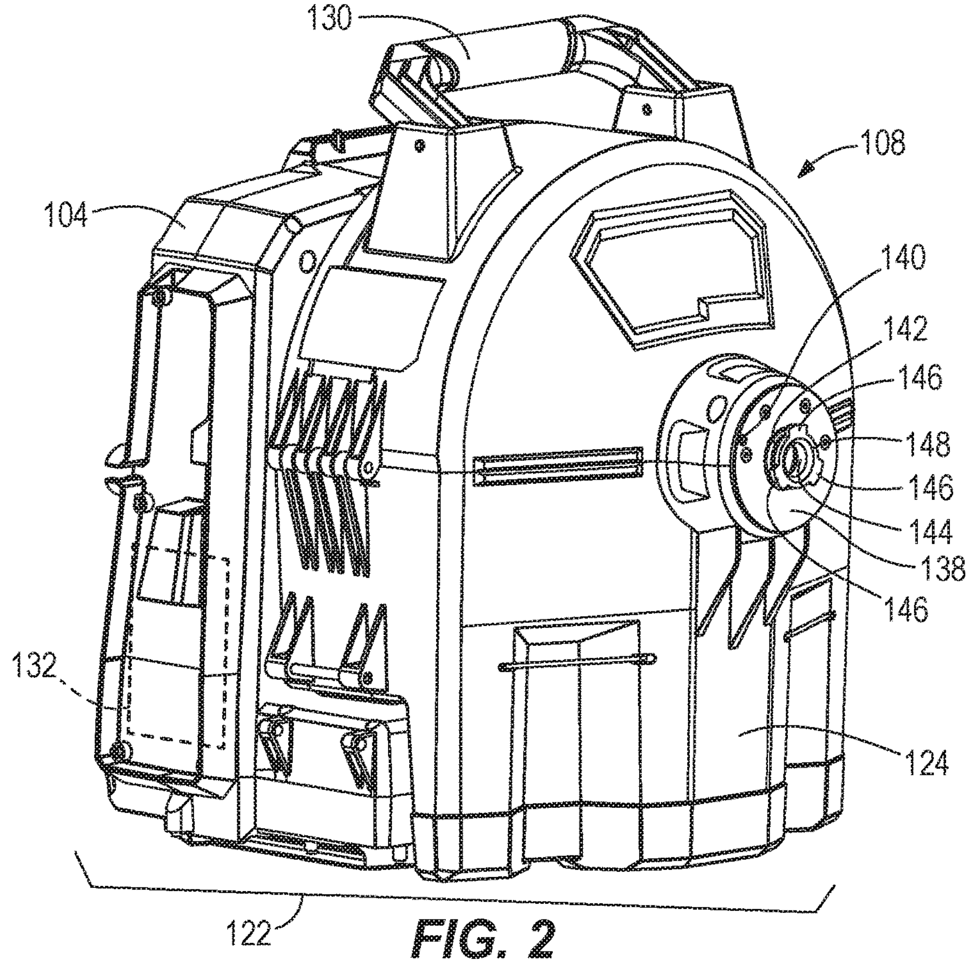
FIG. 2 is a perspective view of a drain cleaner of the drain cleaner assembly of FIG. 1.
Figure 4:
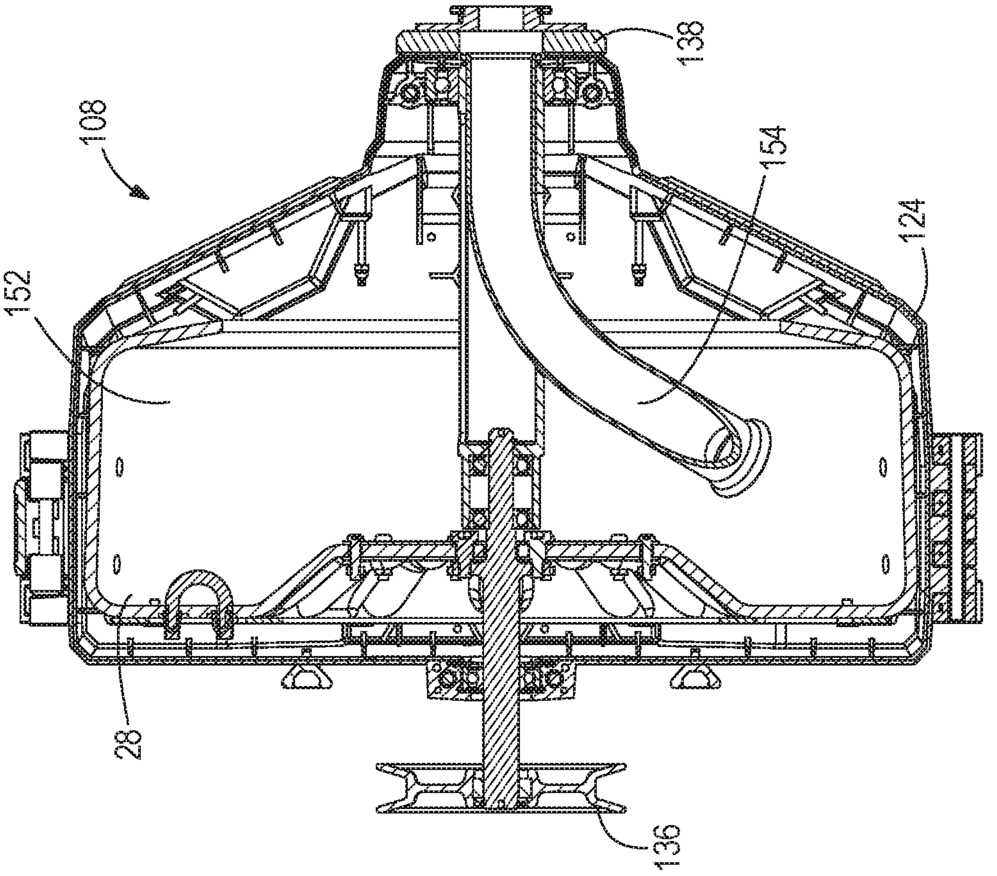
FIG. 4 is a cross-sectional view of the drum unit of FIG. 3.
Figure 3:
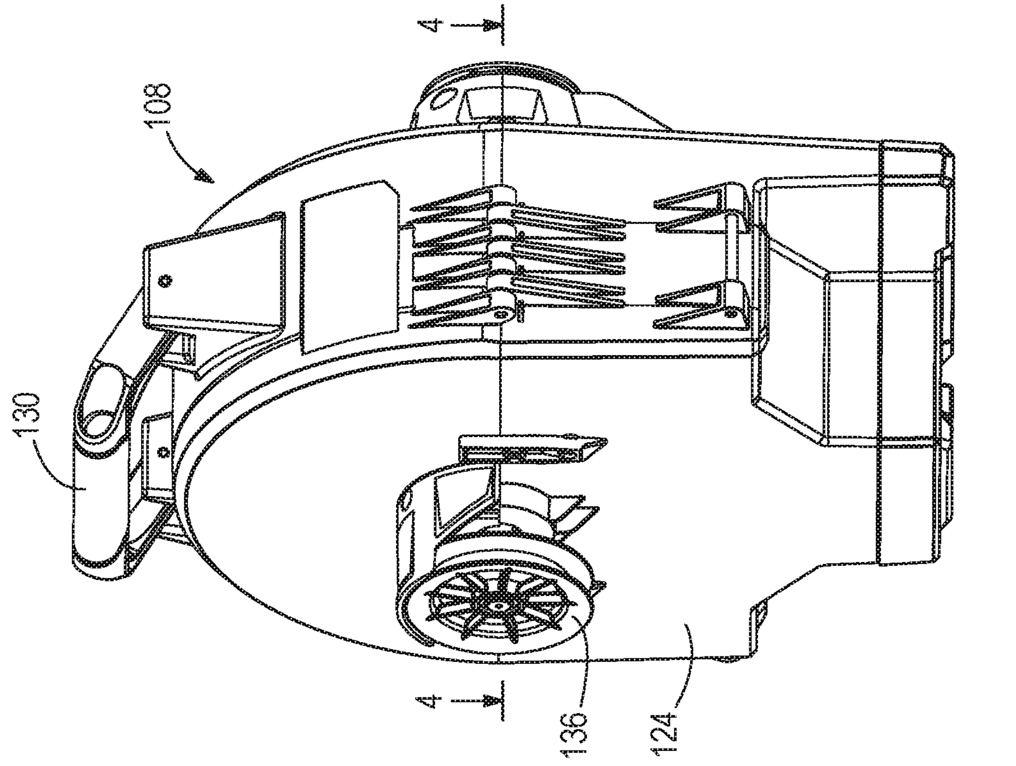
FIG. 3 is a perspective view of a drum unit of the drain cleaner assembly of FIG. 1.

As shown in FIGS. 1 and 2, the drive unit 104 includes a schematically illustrated belt drive mechanism 132 for rotating the inner drum 128 relative to the outer housing 124, such that the feed mechanism 116 may be used to rotate or translate the cable 112 within a plumbing line or the auxiliary tube 120, as explained in further detail below. Specifically, as shown in FIGS. 3 and 4, the drum unit 108 includes a pulley 136 coupled to the inner drum 128. When the drum unit 108 is coupled to the drive unit 104, the pulley 136 is operatively coupled to the drive mechanism 132 to receive torque therefrom. In some embodiments, the drive mechanism 132 is a belt drive arrangement including a motor and one or more belts. In some embodiments, the drive unit 104 and the drive mechanism 132 are identical or substantially similar to the drive unit and drive arrangement described in U.S. patent application Ser. No. 16/140,682 ("the '682 applications"), filed on Sep. 25, 2018, which is incorporated herein by reference.

Figure 5:
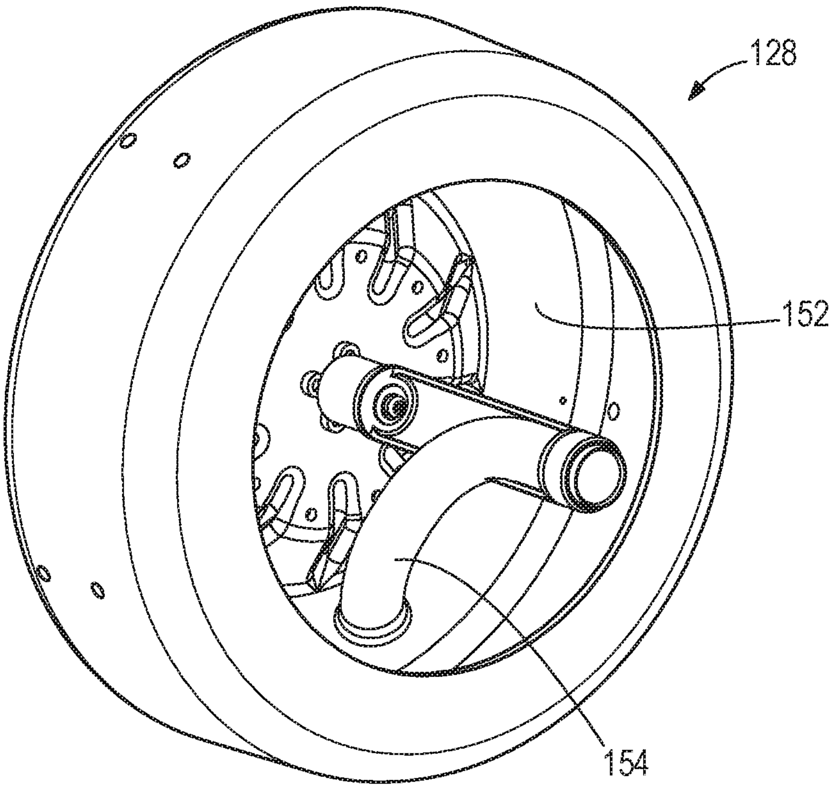
FIG. 5 is a perspective view of an inner drum of the drum unit of FIG. 3.

As shown in FIG. 2, the outer housing 124 includes a mounting plate 138 with a lock aperture 140, an extension 142 including an opening 144 for the cable 112, and a plurality of tangs 146 extending radially outward from an end 148 of the extension 142. In the illustrated embodiment, the extension 142 is cylindrical. However, in other embodiments, the extension 142 can have other geometries, such as having a polygonal cross-section. In other embodiments still, the extension 142 can include rails or latches. In the illustrated embodiment, there are three tangs 146 but in other embodiments, there can be more or fewer tangs 146. As shown in FIGS. 4 and 5, the inner drum 128 includes a cavity 152 for holding the cable 112 and a guide conduit 154 for guiding the cable 112 from the cavity 152 to the opening 144 as the inner drum 128 is rotated relative to the outer housing 124. In some embodiments, the drum unit 108 is substantially similar to the drum unit described in the '682 applications.

Figure 6:
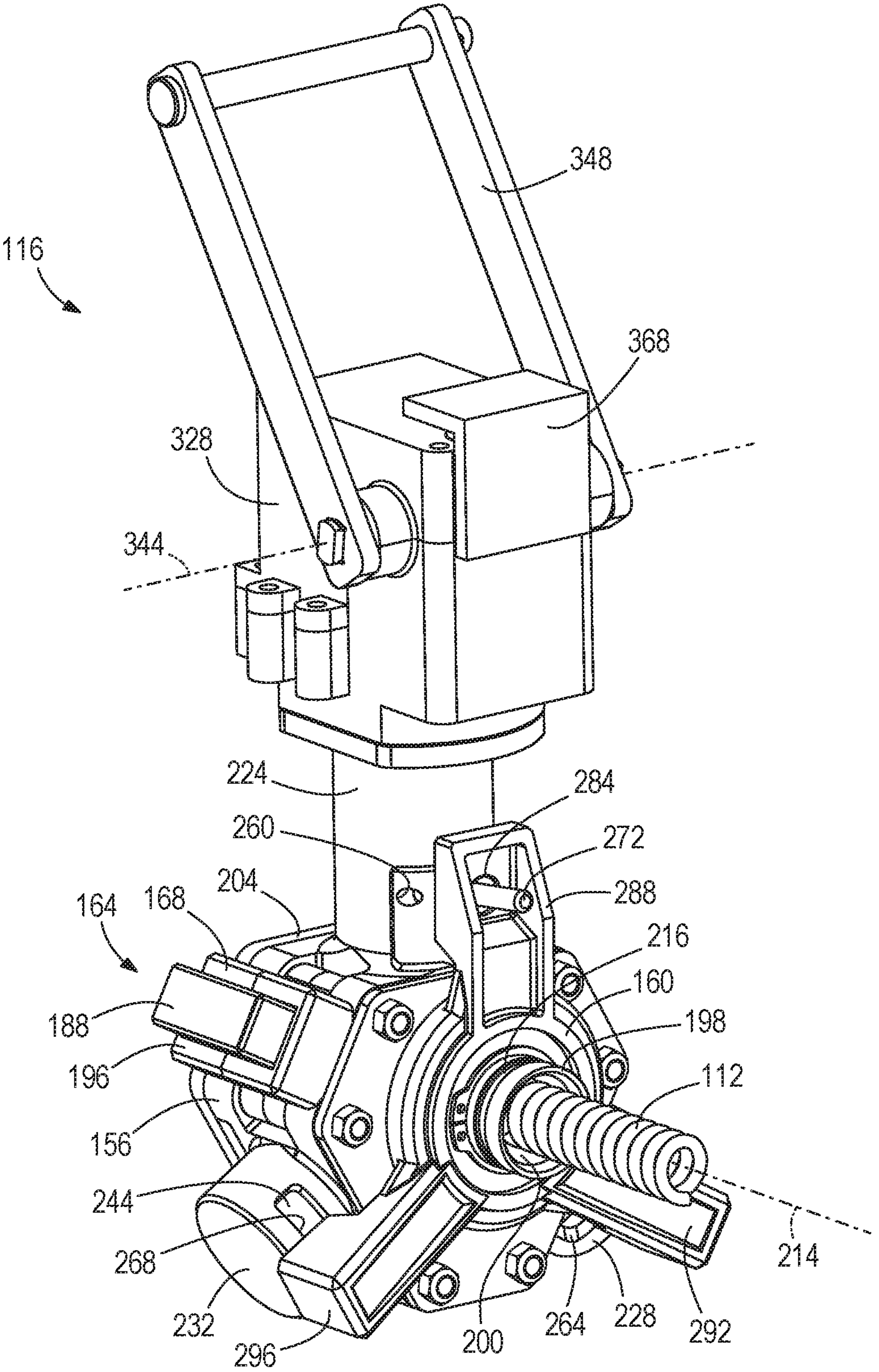
FIG. 6 is a perspective view of a feed mechanism of the drain cleaner assembly of FIG. 1.
Figure 7:
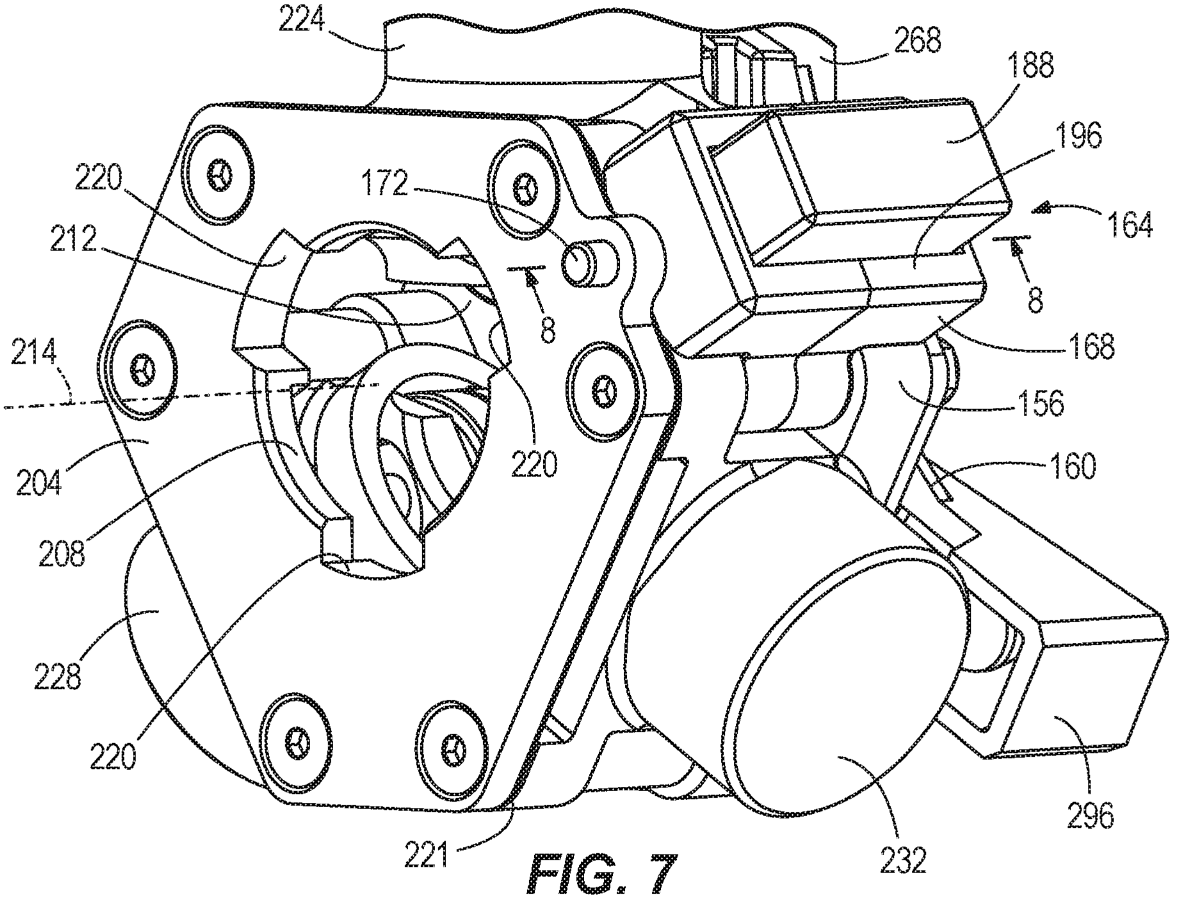
FIG. 7 is an enlarged perspective view of the feed mechanism of FIG. 6.
Figure 8:
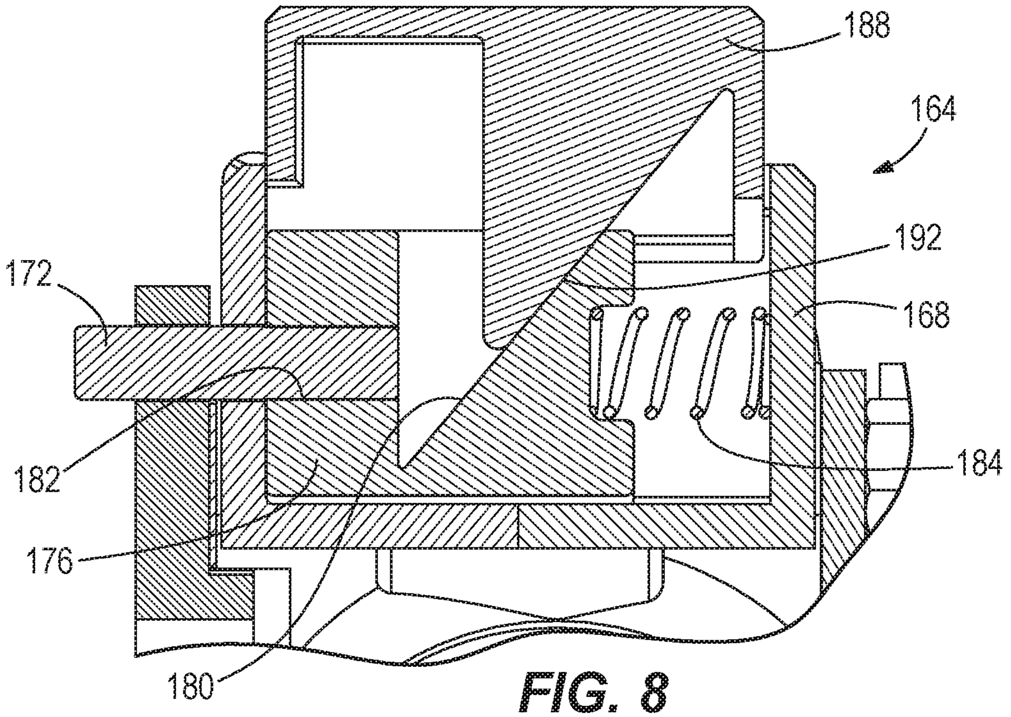
FIG. 8 is a cross-sectional view of a release mechanism of the feed mechanism of FIG. 6.

FIGS. 6-13 illustrate the feed mechanism 116. The feed mechanism 116 includes a frame 156, a mode selection member, such as mode selection plate 160 that is rotatable with respect to the frame 156, and a release mechanism 164 for decoupling the frame 156 from the mounting plate 138 of the outer housing 124. With reference to FIGS. 6-8, the release mechanism 164 includes a release housing 168 coupled to the frame 156 and a locking pin 172 that is coupled for translation in the release housing 168 with a cam member 176 that has a first cam surface 180. In some embodiments, the locking pin 172 is insert molded into a recess 182 of the cam member 176. However, in other embodiments, the locking pin 172 is knurled and thereby retained within the recess 182. In other embodiments still, the locking pin 172 is smooth and is press fit into the recess 182 of the cam member 186.

Figure 10:
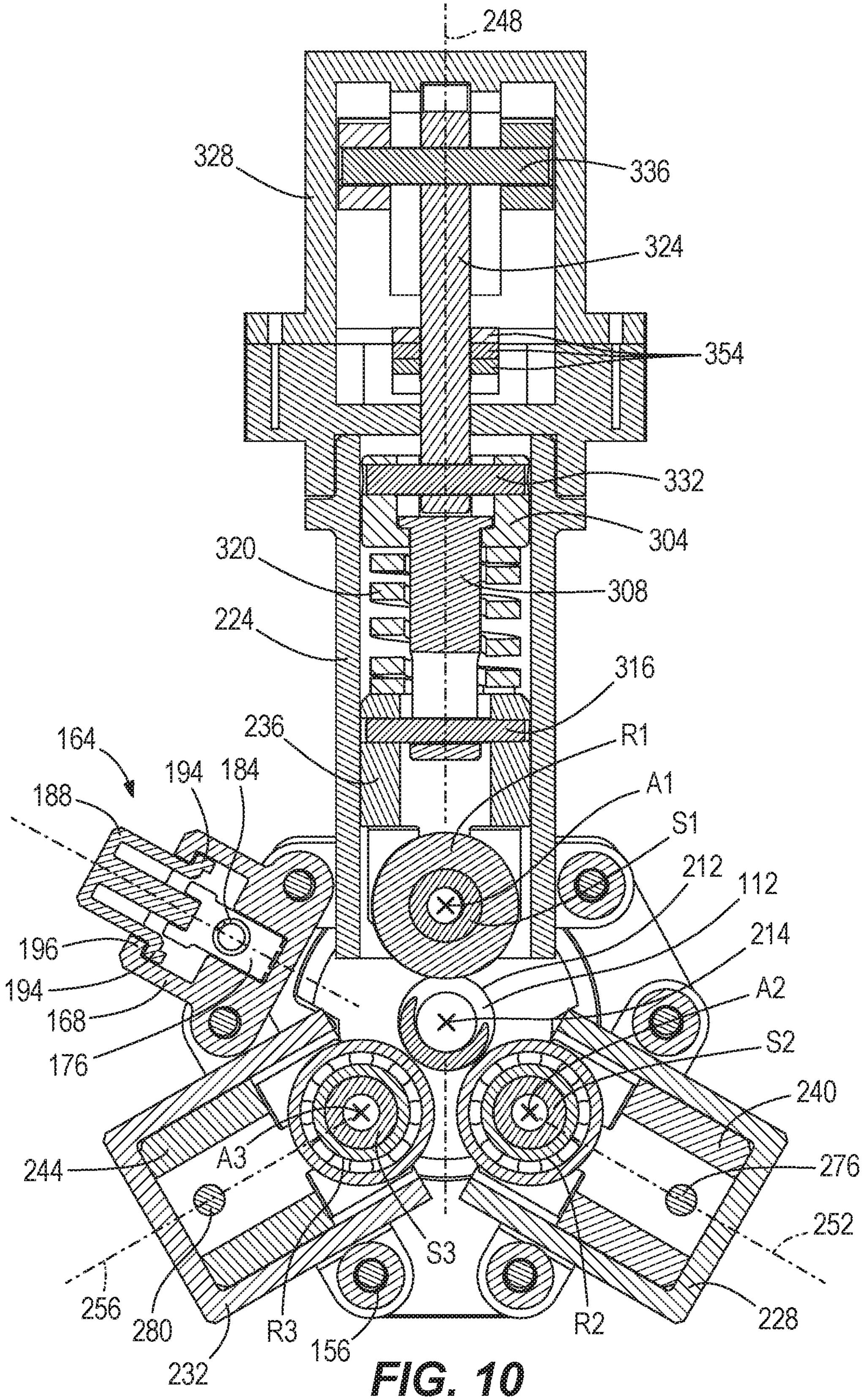
FIG. 10 is a cross-sectional view of the feed mechanism of FIG. 6, with the lever in the active position.
Figure 13:
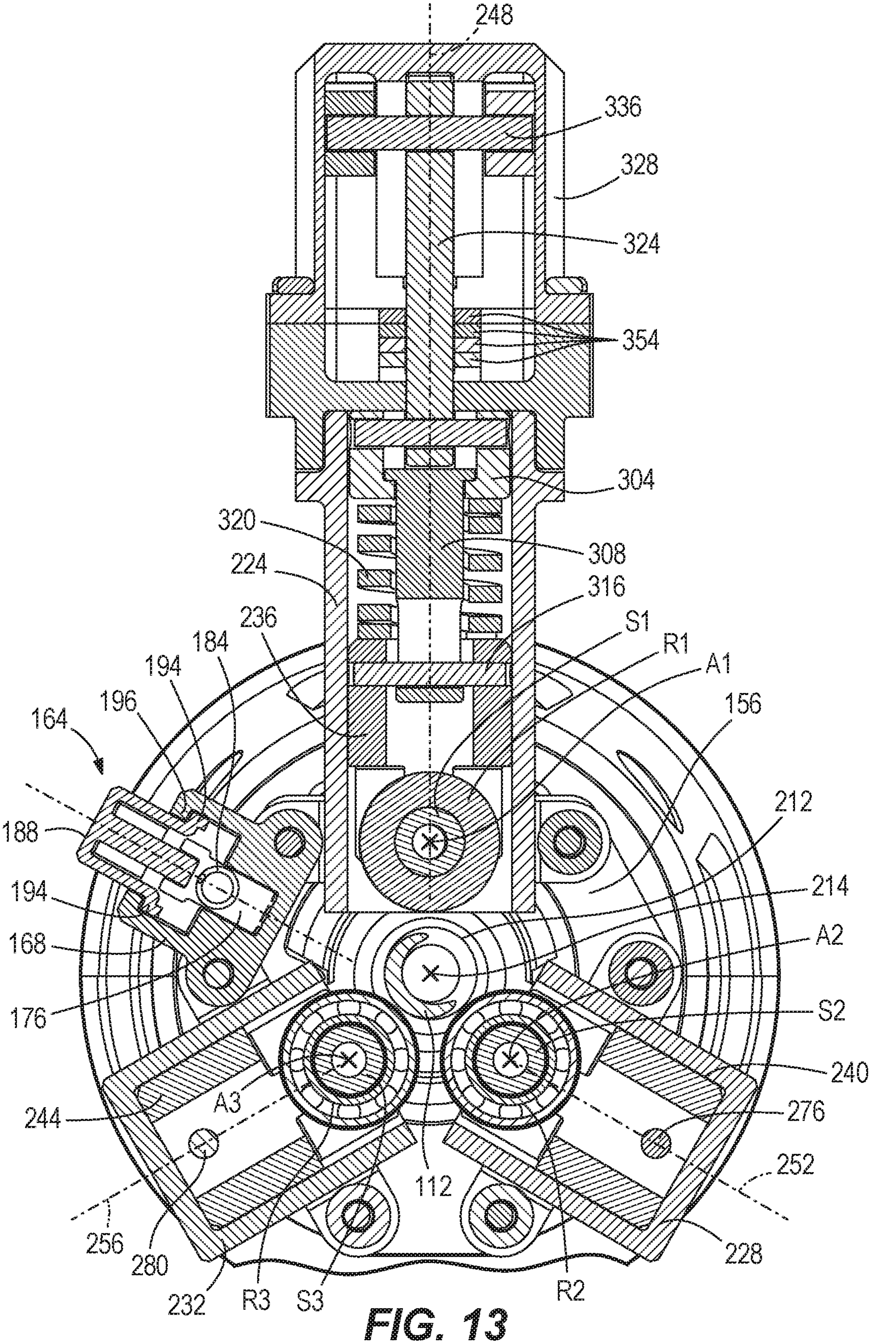
FIG. 13 is a cross-sectional view of the feed mechanism of FIG. 6, with the lever in the inactive position.

The cam member 176 is biased by a compression spring 184 arranged in the release housing 168, such that the locking pin 172 is biased out of the release housing 168 toward a locked position shown in FIGS. 7 and 8. The release mechanism 164 further includes an actuator 188 with a second cam surface 192 that is engaged against the first cam surface 180 of the cam member 176. Via the engagement of the second cam surface 192 against the first cam surface 180, the actuator 188 is biased away from the release housing 168 by the cam member 176 when the locking pin 172 is in the locked position. However, the actuator 188 is prevented from being ejected from the release housing 168 by internal lateral actuator flanges 194 that abut against an uppermost portion 196 of the release housing 168, as shown in FIGS. 10 and 13.

Figure 9:
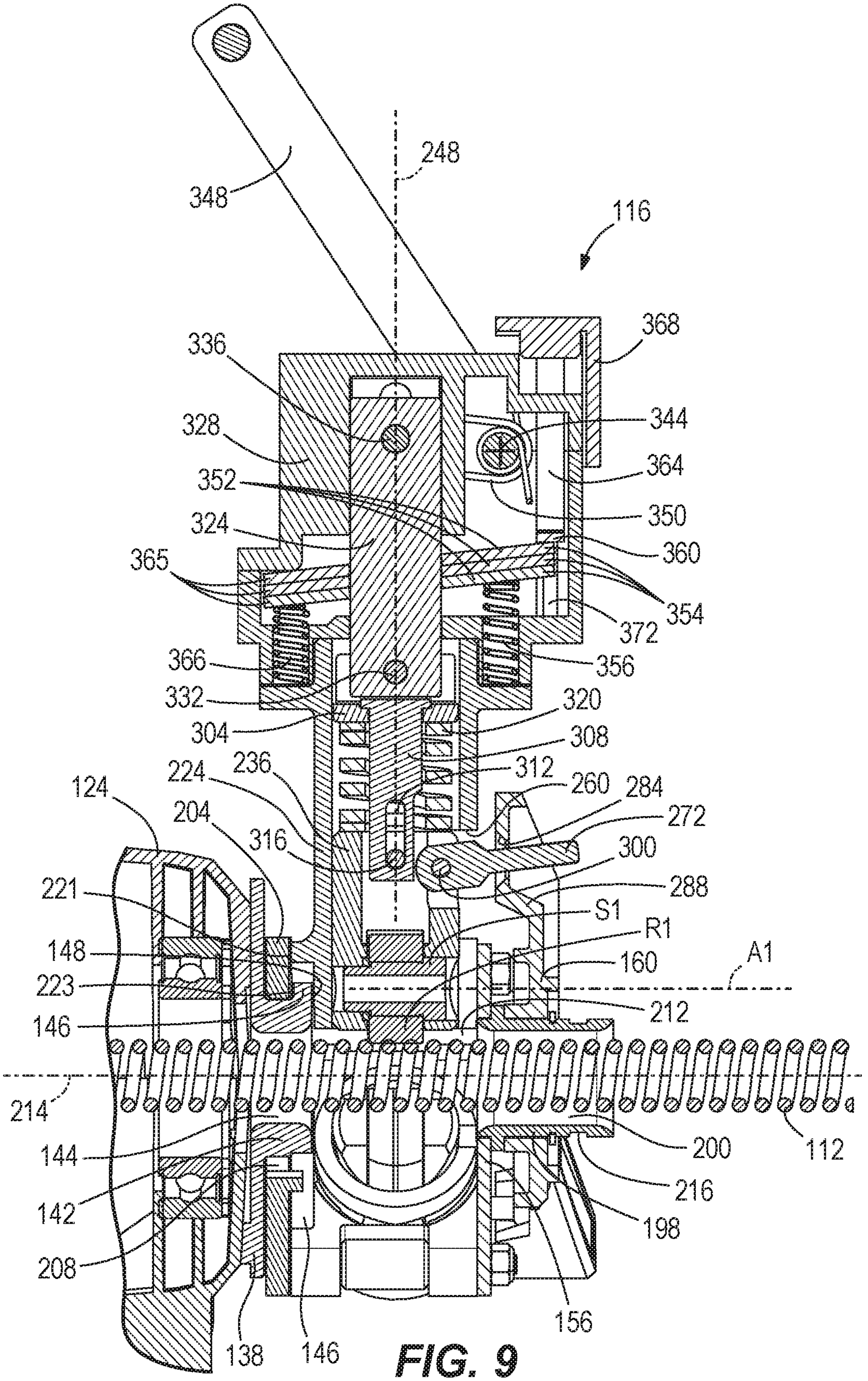
FIG. 9 is a cross-sectional view of the feed mechanism of FIG. 6, with a lever in an active position.

With reference to FIGS. 6, 7 and 9, the mode selection plate 160 includes a cylindrical extension 198 including a front aperture 200, and a rear plate 204 of the frame 156 includes a rear aperture 208. A cable passage 212 defining a cable axis 214 extends from the rear aperture 208 to the front aperture 200. The cylindrical extension 198 includes an annular recess 216 for receipt of a coupling member 218 (FIG. 1) of the auxiliary tube 120, such that the auxiliary tube 120 can be axially locked onto the cylindrical extension 198 while remaining rotatable with respect to the cylindrical extension 198. In the illustrated embodiment, the coupling member 218 is a threaded fastener. In other embodiments, the coupling member 218 is a spring loaded pin or detent that could be received into the annular recess 216. With reference to FIG. 7, the rear plate 204 of the frame 156 further includes a plurality of openings 220 that extend radially outward from the rear aperture 208. In the illustrated embodiment, there are three openings 220 to correspond to the three tangs 146, but in other embodiments there can be more or fewer openings 220, to correspond to the number of tangs 146 on the end 148 of the extension 142.

Figure 12:
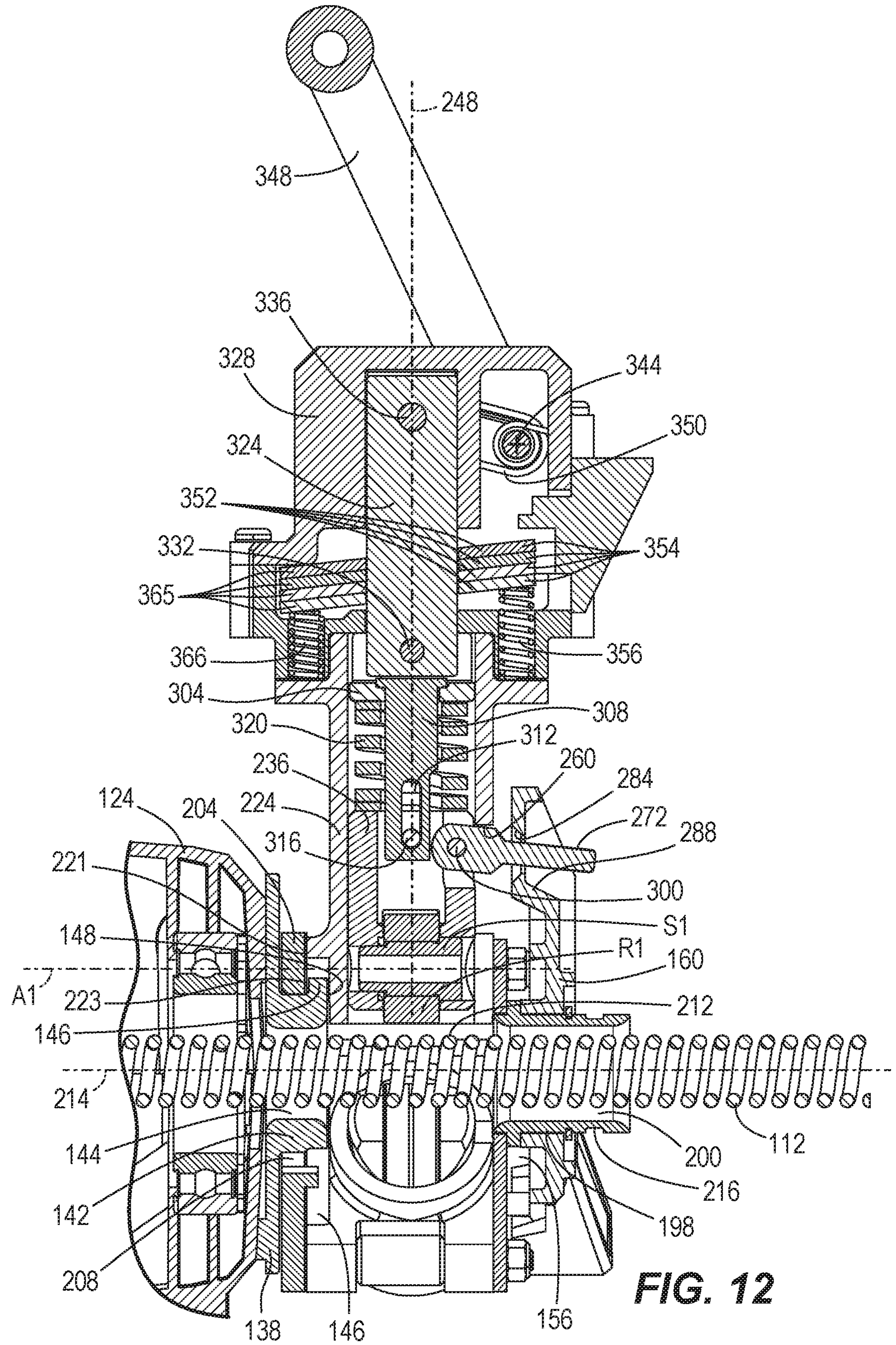
FIG. 12 is a cross-sectional view of the feed mechanism of FIG. 6, with the lever in an inactive position.
Figure 14:
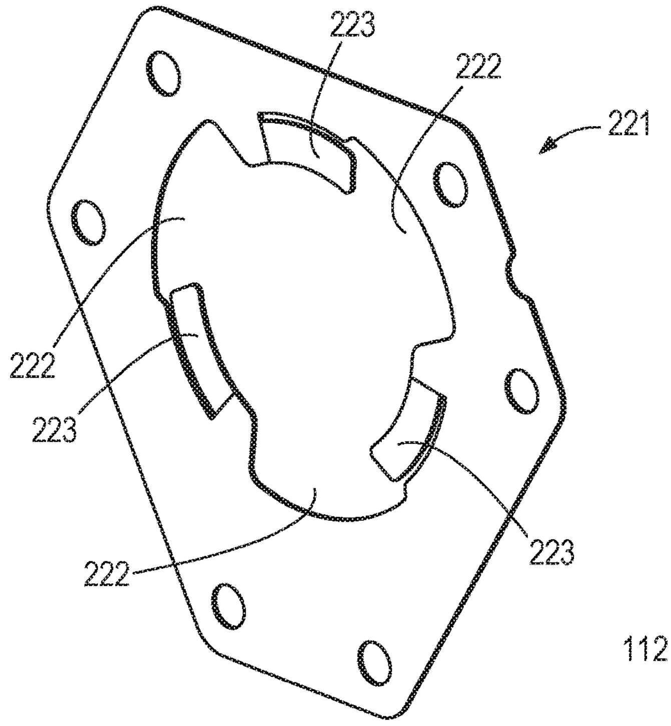
FIG. 14 is a perspective view of a spring plate of the feed mechanism of FIG. 6.

As shown in FIGS. 9, 12 and 14, a spring plate 221 with a plurality of openings 222 and a plurality of flat spring members 223 is arranged adjacent the rear plate 204 of the frame 156 on a side of the rear plate 204 facing the mode selection plate 160. The openings 222 are rotationally aligned and fixed with respect to the openings 220 of the rear plate 204. In the illustrated embodiment, there are three openings 222 and three flat spring members 223 but in other embodiments, there can be more or fewer openings 222 and flat spring members 223, to correspond of the number of tangs 146 on the end 148 of the extension 142.

To couple the feed mechanism 116 to the drum unit 108, an operator first axially slides the rear aperture 208 of the rear plate 204 over the extension 142 of the mounting plate 138 by ensuring that the tangs 146 are rotationally aligned with the openings 220 until the rear plate 204 is abutted against the mounting plate 138. The ability to slide the feed mechanism 116 axially onto the extension 142 provides a substantial advantage to the operator, because even if the cable 112 is already protruding from the opening 144 of the extension 142, the operator can still mount the feed mechanism 116 to the drum unit 108 without first having to retract the cable 112. Thus, the required time to mount the feed mechanism 116 to the drum unit 108 is reduced. The operator subsequently rotates the feed mechanism 116 about the extension 142 of the mounting plate 138 until the locking pin 172 is biased to its locked position into the lock aperture 140, at which point the feed mechanism 116 is prevented from further rotation with respect to the extension 142. Also, because the tangs 146 have become rotationally misaligned with the openings 220, and the rear plate 204 of the frame 156 is arranged between the mounting plate 138 and the tangs 146 (FIGS. 9 and 12), the feed mechanism 116 is prevented from moving axially with respect to the mounting plate 138. Further, once the locking pin 172 has been received in the lock aperture 140, the tangs 146 have become rotationally aligned with the spring members 223, which are now in between the tangs 146 and the rear plate 204. The spring members 223 thereby contact the tang members 146 to bias the rear plate 204 away from the tang members 146 (see FIGS. 9 and 12), thus pushing the rear plate 204 closer to the mounting plate 138 and reducing clearance therebetween. Thus, the feed mechanism 116 is locked onto the mounting plate 138 of the drum unit 108.

To decouple the feed mechanism from the drum unit 108, the operator first depresses the actuator 188 into the release housing 168, causing the second cam surface 192 to slide against the first cam surface 180, thus forcing the cam member 176 to move towards the compression spring 184 and the locking pin 172 to move out of the lock aperture 140 of the mounting plate 138. The operator may then rotate the feed mechanism 116 with respect to the extension 142 until the tangs 146 are rotationally aligned with the openings 220, at which point the operator may axially slide the feed mechanism 116 off of the extension 142. The ability to slide the feed mechanism 116 axially off the extension 142 provides a substantial advantage to the operator, because if the cable 112 is still protruding from the opening 144 of the extension 142, the operator can still remove the feed mechanism 116 from the drum unit 108 without first having to retract the cable 112. Thus, the required time to remove the feed mechanism 116 from the drum unit 108 is reduced. The feed mechanism 116 is then decoupled from the mounting plate 138 and the drum unit 108. The feed mechanism 116 is therefore conveniently configured to be coupled to and removed from the first drain cleaner 122 without the use of tools.

The feed mechanism 116 will now be explained in more detail. With reference to FIGS. 6, 6A, 9 and 10, the feed mechanism 116 includes first, second, and third sleeves 224, 228, 232 coupled to the frame 156. The first, second and third sleeves 224, 228, 232 respectively hold first, second, and third roller retainers 236, 240, 244 and respectively define first, second, and third retainer axes 248, 252, 256 (FIGS. 10 and 13) that each intersect and are perpendicular to the cable axis 214. In some embodiments, the first, second and third sleeves 224, 228, 232 and first, second and third roller retainers 236, 240, 244 are both formed of aluminum. To mitigate potential galling respectively between the first, second and third sleeves 224, 228, 232 and first, second and third roller retainers 236, 240, 244, as the first, second and third roller retainers 236, 240, 244 move within the first, second and third sleeves 224, 228, 232, a graphite based Molykote grease may be respectively applied between the first, second and third sleeves 224, 228, 232 and first, second and third roller retainers 236, 240, 244. Alternatively, the first, second and third roller retainers 236, 240, 244 may be hard coat anodized. A hard coat anodization of the first, second and third roller retainers 236, 240, 244 does not wash away like Molykote, reducing the frequency with which the first, second and third roller retainers 236, 240, 244 require maintenance.

Figure 21:
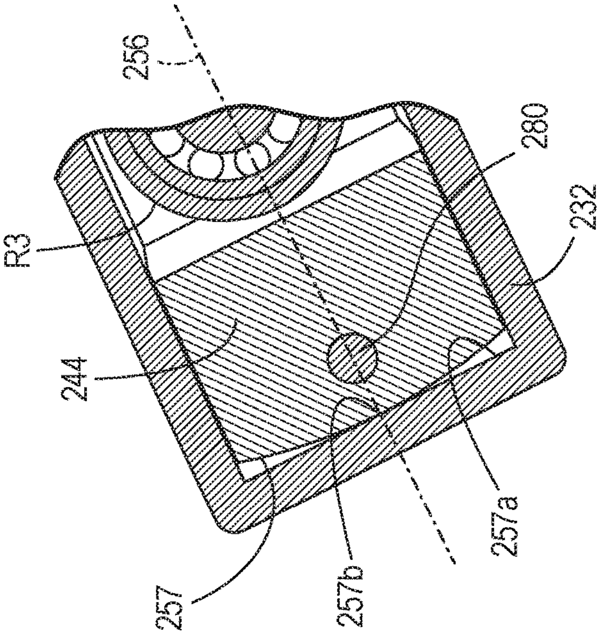
FIG. 21 is a partial cross-sectional view of the feed mechanism of FIG. 6, according to another embodiment of the invention.

As shown in FIG. 21, in some embodiments, each of the second and third roller retainers 240, 244 include a curvilinear, rounded bottom 257 that bears against a respective bottom 257*a* of the second and third sleeves 228, 232 (only the third roller retainer 244 and third sleeve 232 are shown in FIG. 21). Because the bottoms 257 are rounded, the second and third roller retainers 240, 244 only frictionally engage the bottoms 257*a* of the second and third sleeves 228, 232 at a single point of contact 257*b* that is intersected, respectively, by the first and second retainer axes 252, 256, making it much easier for an operator to rotate the second and third roller retainers 252, 256 via the mode selection plate 160. In contrast, if the bottoms 257 of the second and third roller retainers 252, 256 were flat, there would be more frictional contact between the respective bottoms 257, 257*a* of the second and third roller retainers 252, 256 and sleeves 228, 232, which would make it harder to rotate the second and third roller retainers 252, 256 via the mode selection plate 160.

As shown in FIG. 10, the first, second, and third roller retainers 236, 240, 244 retain first, second, and third rollers R1, R2, R3 that respectively define first, second, and third roller axes A1, A2, A3. The first, second, and third rollers R1, R2, R3 are respectively rotatably supported on first, second and third rollers shafts S1, S2, S3 that are fixedly coupled to the first, second, and third roller retainers 234, 240, 244. In the position of mode selection plate 160 shown in FIGS. 1 and 6, 9, 10, 12 and 13 the first, second, and third roller axes A1, A2, A3 are parallel to the cable axis 214.

Figure 15:
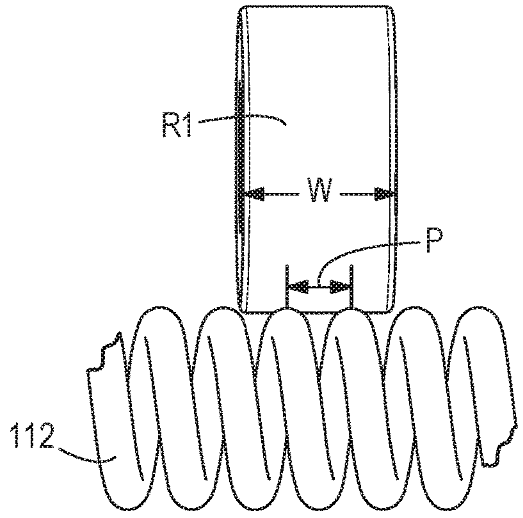
FIG. 15 is a plan view of a roller of the feed mechanism of FIG. 6 engaged against a cable.

FIG. 15 illustrates the first roller R1 engaged against the cable 112, and specifically shows that the width of the roller W is greater than a pitch P of the cable 112. The pitch P of the cable 112 is a distance between two consecutive coils of the cable 112, measured parallel to the cable axis 214. The width of the roller W is selected so that it will be greater than the pitch P of the cable 112 no matter what type of cable 112 is used. While FIG. 15 only shows the first roller R1, each of the second and third rollers R2, R3 is identical to the first roller R1.

Figure 16:
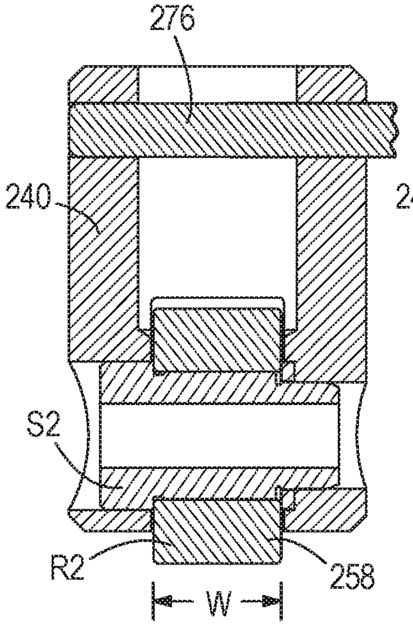
FIG. 16 is a cross-sectional view of the feed mechanism of FIG. 6 with portions removed, according to an embodiment of the invention.
Figure 17:
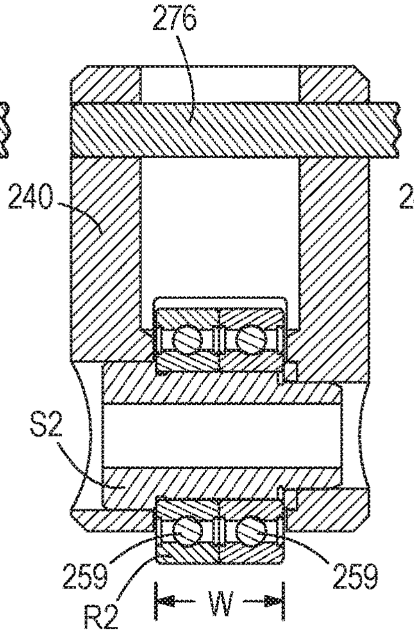
FIG. 17 is a cross-sectional view of the feed mechanism of FIG. 6 with portions removed, according to an embodiment of the invention.
Figure 18:
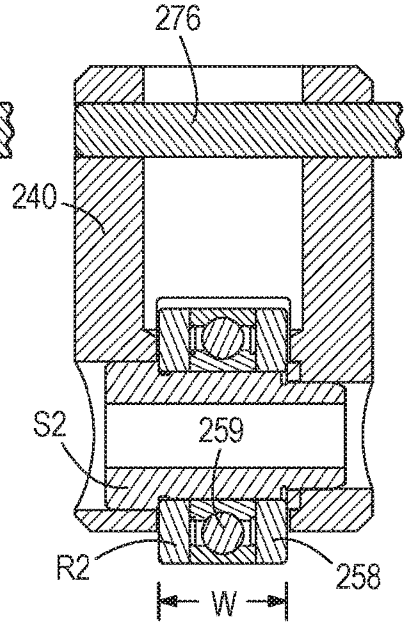
FIG. 18 is a cross-sectional view of the feed mechanism of FIG. 6 with portions removed, according to an embodiment of the invention.

FIGS. 16-18 respectively show first, second, and third embodiments of how the first, second, and third rollers R1, R2 and R3 are constructed. For purposes of illustration, only the second roller R2 is used as an example in FIGS. 16-18. FIG. 16 shows a first embodiment in which the second roller R2 includes a wide bushing 258 having the width W. FIG. 17 shows a second embodiment in which the second roller R2 includes a pair of adjacent bearings 259 that together have the width W. FIG. 18 illustrates a third embodiment, in which the second roller R2 includes a wide bushing 258 having width W with a single bearing 259 pressed into the bushing 258. Thus, the third embodiment of FIG. 18 permits the second roller R2 to have a width W while only necessitating one bearing 259, which reduces manufacturing cost.

Figure 6A:
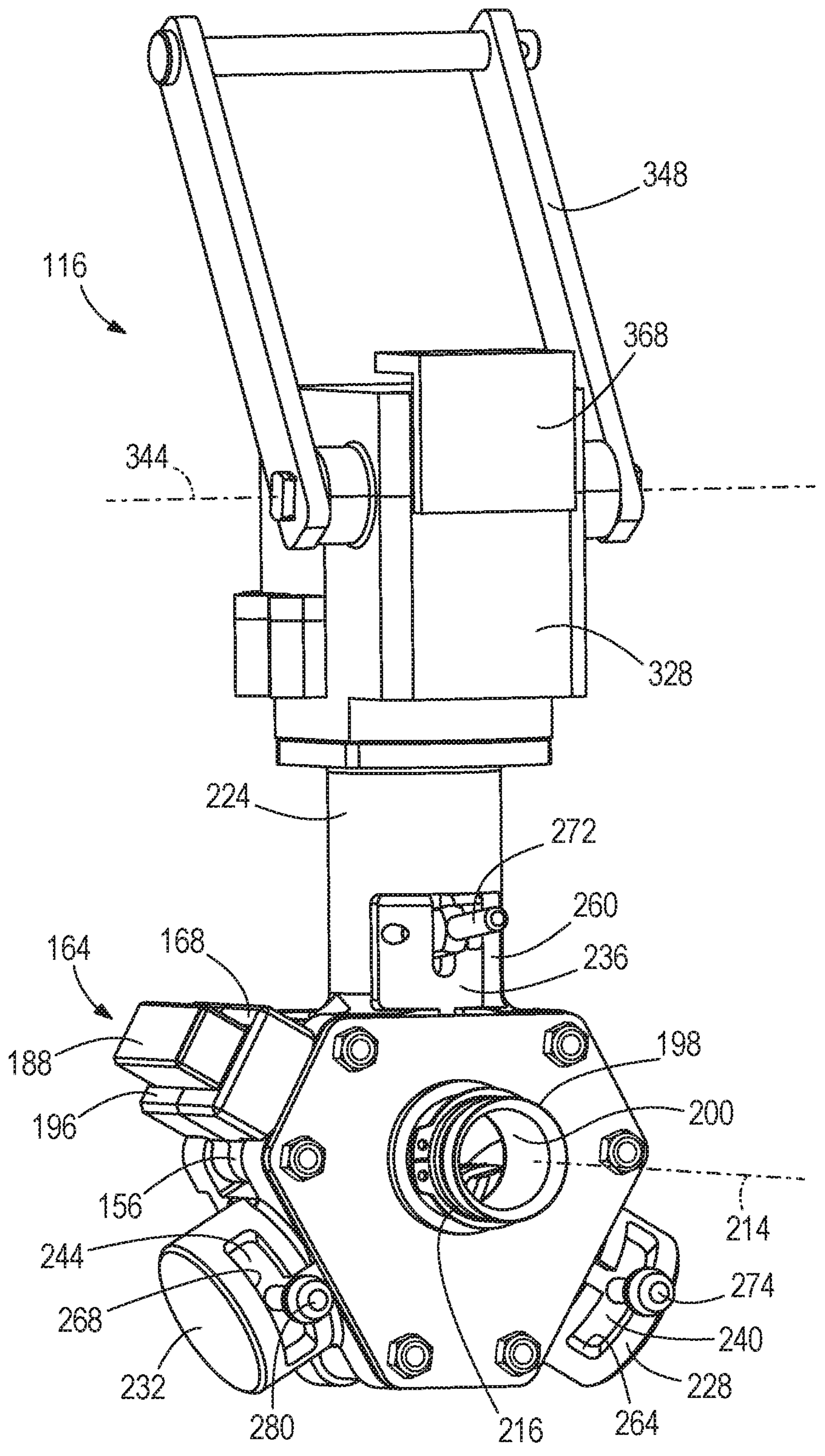
FIG. 6A is a perspective view of the feed mechanism of FIG. 6, with a mode selection plate removed.

As shown in FIG. 6A, the first, second, and third sleeves 224, 228, 232 respectively include first, second, and third slots 260, 264, 268 through which first, second, and third pins 272, 276, 280 of the first, second, and third roller retainers 236, 240, 244 respectively extend and are configured to translate. As shown in FIG. 6, the first pin 272 is arranged in a first aperture 284 of a first arm 288 of the mode selection plate 160, and the second and third pins 276, 280 are arranged within second and third arms 292, 296 of the mode selection plate 160.

The mode selection plate 160 is rotatable about the cable axis 214 with respect to the frame 156 between a first, spin-mode, position shown in FIGS. 1, 6, 10 and 13, a second, forward-drive, position, and a third, reverse-drive position. In the spin-mode position, the first, second, and third roller axes A1, A2, A3 are parallel to the cable axis 214. However, as the mode selection plate 160 rotates with respect to the frame 156 about the cable axis 214 to the forward-drive position, the first, second, and third pins 272, 276, 280 are caused to rotate in the first, second, and third slots 260, 264, 268, thus causing the first, second and third roller retainers 236, 240, 244 to rotate about the first, second, and third retainer axes 248, 252, 256. Rotation of the first, second, and third roller retainers 236, 240, 244 causes each of the first, second, and third rollers R1, R2, R3 to also rotate about the first, second, and third retainer axes 248, 252, 256 to a position in which the first, second, and third roller axes A1, A2, A3 are not parallel to the cable axis 214, and are in a position to drive the cable 112 in a first direction along the cable axis 214, such that the cable 112 is driven forwardly out of the front aperture 200. In some embodiments, when the mode selection plate 160 is in the second position, forward-drive position, the first, second, and third roller retainers 236, 240, 244, and the first, second and third rollers R1, R2, and R3 are all rotated 45° in a first rotational direction about the respective roller retainer axes 248, 252, 256. The second, forward-drive position allows the cable 112 to be driven at a maximum speed in a forward direction by the feed mechanism 116. If the operator elects to rotate the mode selection plate 160 to a position intermediate the first and second positions, the first, second and third rollers R1, R2, and R3 are all rotated less than 45° in the first rotational direction about the respective roller retainer axes 248, 252, 256, such that they drive the cable 112 forward, but at a speed that is less than the maximum speed achieved in the second position.

Similarly, as the mode selection plate 160 rotates with respect to the frame 156 about the cable axis 214 to the reverse-drive position, each of the first, second, and third roller retainers 236, 240, 244 and the first, second, and third rollers R1, R2, R3 rotate about the first, second, and third retainer axes 248, 252, 256 to a position in which the first, second, and third roller axes A1, A2, A3 are not parallel to cable axis 214, and are in a position to drive retraction of the cable 112 into the front aperture 200, moving the cable 112 in a second direction that is opposite the first direction, along the cable axis 214. In some embodiments, when the mode selection plate 160 is in the third, reverse-drive position, the first, second, and third roller retainers 236, 240, 244, and the first, second and third rollers R1, R2, and R3 are all rotated 45° in a second rotational direction that is opposite the first rotational direction about the respective roller retainer axes 248, 252, 256. The third, reverse-drive position allows the cable 112 to be driven at a maximum speed in a reverse direction by the feed mechanism 116. If the operator elects to rotate the mode selection plate 160 to a position intermediate the first and third positions, the first, second and third rollers R1, R2, and R3 are all rotated less than 45° in the second rotational direction about the respective roller retainer axes 248, 252, 256, such that they drive the cable 112 in a reverse direction, but at a speed that is less than the maximum speed achieved in the third position.

With reference to FIGS. 9 and 10, the first pin 272 is pivotably coupled to the first roller retainer 236 via a hinge joint 300, such that the first pin 272 can pivot up and down along a second plane that is perpendicular to a first plane that the first pin 272 rotates about, when the first pin 272 is rotating about the first retainer axis 248. The first roller retainer 236 is coupled to a cap 304 via a linkage member 308 having a slot 312. Specifically, the first roller retainer 236 includes a first cross-pin 316 extending through the slot 312 in a direction perpendicular to the first retainer axis 248. A compression spring 320 is arranged about the linkage member 308 between the first roller retainer 236 and the cap 304 within the first sleeve 224. Because the first pin 272 is able to pivot within first slot 260 when the first roller retainer 236 translates within the first sleeve 224, while also being able to rotate within the first slot 260 when the mode selection plate 160 is rotated to select a position, the feed mechanism 116 is able to engage and drive a wide range of cable sizes. Without the first pin 272, which is able to both rotate and pivot, the mode selection plate 160 would not be able to move the first, second and third rollers R1, R2, R3 to the second and third positions, to respectively maximize the forward and reverse speeds. Also, without the first pin 272, the maximum size of a cable 112 would have to be reduced.

The cap 304 is coupled to a plunger 324 arranged in a plunger housing 328 via a second cross-pin 332. The plunger 324 has a third cross-pin 336 arranged through a pair of slots 338 (one shown in FIG. 11) of two pivot arms 340 arranged inside the plunger housing 328. The pivot arms 340 are coupled for pivotal movement about a lever axis 344 with an activator, such as lever 348, arranged outside of the plunger housing 328. The lever 348 is pivotable about the lever axis 344 between a first, inactive, position (FIGS. 12 and 13), in which the first roller R1 is spaced from the cable passage 212 and disengaged from the cable 112, and a second, active position (FIGS. 9 and 10) in which the first roller R1 is moved into the cable passage 212 into a position in which it engages the cable 112. Thus, the first roller R1 is a translatable roller that is translatable, via the first roller retainer 236, within the first sleeve 224, between the first and second positions. Specifically, the lever 348 is rotated in a direction towards the drum unit 108 when moving from the inactive to active positions. Rotating the lever 348 toward the drum unit 108 provides additional stability and mitigates the risk that the drain cleaning assembly 100 will tip over, in contrast with embodiments in which the lever 348 is rotated away from the drum unit 108 to the active position, which can tend to cause the drain cleaning assembly 100 to fall forward. A torsion spring 350 arranged in the plunger housing 328 biases the pivot arms 340 and lever 348 toward the inactive position. In other embodiments, instead of a torsion spring 350, a compression or extension spring may be used to bias the pivot arms 340 and lever 348 toward the inactive position.

As the lever 348 rotates from the inactive position to the active position, the pivot arms 340 rotate about the lever axis 344 and the third cross-pin 336 translates within the slots 338 of the pivot arms 340. As the third cross-pin 336 translates, the plunger 324 is moved in a direction towards the cable axis 214, thus causing the cap 304 to move toward the cable axis 214. The cap 304 thus pushes the compression spring 320 toward the first roller retainer 236, causing the first roller retainer 236 to translate in the first sleeve 224, and thus the first roller R1 to move into the cable passage 212 and engage the cable 112. Thus, the first roller retainer 236 is a translatable roller retainer. The compression spring 320 can compress between the first roller retainer 236 and the cap 304 in response to the engagement of the first roller R1 with the cable 112, in particular for situation in which the cable 112 has a relatively large diameter.

Figure 11:
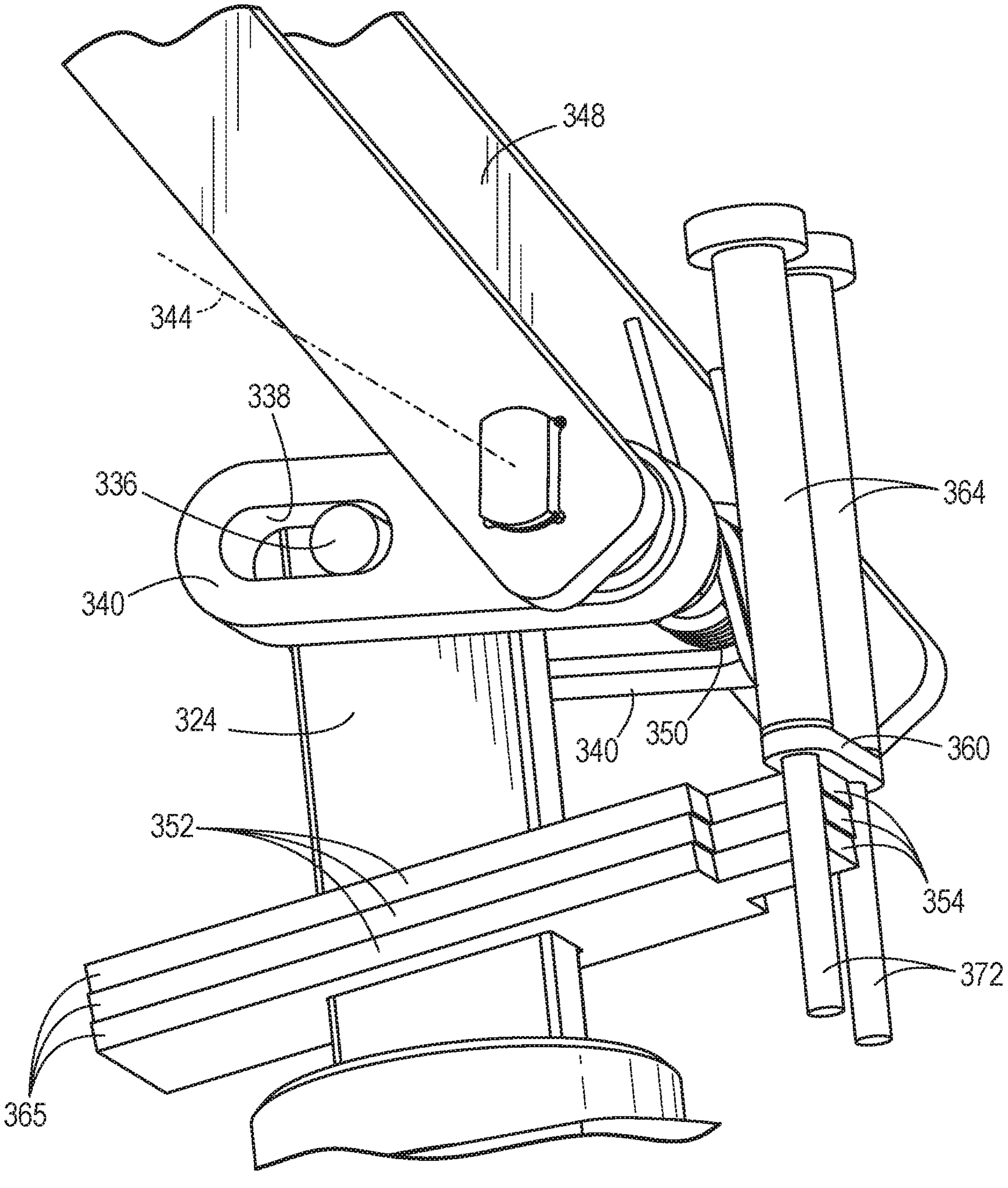
FIG. 11 is an enlarged perspective view of the feed mechanism of FIG. 6, with portions removed.

With reference to FIGS. 9, 11 and 13, one or more friction plates 352 are arranged about and engage the plunger 324. In the illustrated embodiment, there are three friction plates 352, but in other embodiments, more or fewer friction plates 352 can be used. First ends 354 of the friction plates 352 are biased by a first compression spring 356 in the plunger housing 328 upwardly toward a base 360 of two actuator cylinders 364. Second ends 365 of the friction plates 352 are biased upwardly by a second compression spring 366 in the plunger housing 328 to increase the frictional clamping force on the plunger 324 that is described in further detail below. In some embodiments that require a less significant clamping load, the second compression spring 366 is omitted. The actuator cylinders 364 are coupled to a release actuator 368 on the plunger housing 328. The base 360 and actuator cylinders 364 are moveable along stems 372 in the plunger housing 328 in response to movement of the release actuator 368, causing the friction plates 352 to move between a clamping position shown in FIG. 9, and a release position, as described in further detail below.

Once the feed mechanism 116 has been coupled to the drum unit 108, as described above, the operator may wish to use the feed mechanism 116 to clean a plumbing line. The operator may wish to couple the auxiliary tube 120 to the feed mechanism 116 by threading the coupling member 218 into the annular recess 216 of the cylindrical extension 198. Then, the operator activates the drive mechanism 132 of the drive unit 104 to rotate the pulley 136 and thus the inner drum 128, causing the cable 112 to be guided through the guide conduit 154, out the opening 144 of the extension 142 and into the cable passage 212 of the feed mechanism 116. Once the cable 112 is in the cable passage 212, the operator rotates the mode selection plate 160 to the forward-drive position, causing the first, second, and third roller axes A1, A2, A3 to rotate about the first, second, and third retainer axes 248 to a position in which they are not parallel to cable axis 214, and are in a position to drive the cable 112 out of the front aperture 200 and into the auxiliary tube 120.

The operator then moves the lever 348 from the inactive position (FIGS. 12 and 13) to the active position (FIGS. 9 and 10), causing the first roller R1 to be moved into the cable passage 112, thus engaging the cable 112 and causing it to be pushed against the second and third rollers R2, R3. As the first roller retainer 236 is translated within the first sleeve 224 toward the cable axis 214, the first pin 272 pivots within the first slot 260 about the hinge joint 300 in the first roller retainer 236 but remains in the pin aperture 284 of the first arm 288 of the mode selection plate 160. The cable 112 is then caused to move out of out of the front aperture 200, through the auxiliary tube 120, and through the plumbing line.

As the cable 112 is being advanced through the plumbing line by the feed mechanism 116, the operator may release the lever 348. Because the friction plates 352 in their clamping position of FIG. 9 frictionally clamp the plunger 324, the torsion spring 350 is prevented from returning the lever 348 to its inactive position. In other words, the feed mechanism 116 is in a lock-on mode while the lever 348 is in the active position and the friction plates 352 are in their clamping position. Thus, the lever 348 remains in its active position without the operator being required to hold it. In some embodiments, the friction plates 352 have a hardness of greater than 40 HRC and the plunger 324 has a hardness of approximately 80 HRC. However, in other embodiments, the plunger 324 may have a hardness of between 15 HRC and 30 HRC. Regardless, there is always a sufficient difference between the hardness of the friction plates 352 and the plunger 324, such that the friction plates 352 frictionally clamp the plunger 324 in its depressed position, thus keeping the feed mechanism 116 in the lock-on mode.

When the operator is satisfied with how far the cable 112 has been fed into the plumbing line, the operator may depress the release actuator 368 into the plunger housing 328, causing the actuator cylinders 364 and base 360 to move down along the stems 372, pushing the first ends 354 of the friction plates 352 toward the plunger housing 328 and along the plunger 324 until the friction plates 352 are moved to their release position. In this position, the plunger 324 is no longer frictionally clamped, and the torsion spring 350 biases the lever 338 back to the inactive position, such that the first roller R1 is no longer in engagement with the cable 112 or pushing the cable 112 into the second and third rollers R2, R3.

By including the torsion spring 350 to bias the lever 348 to the inactive position, it is clearly communicated to the operator that the first roller R1 is disengaged from the cable 112. However, the torsion spring 350 is not required for the first roller R1 to become disengaged from the cable 112. For instance, in some embodiments, the torsion spring 350 is omitted and after the friction plates 352 have moved to the release position, the plunger 324 is pushed by the compression spring 320 away from the first roller retainer 236, allowing the first roller retainer 236 and first roller R1 to move away from the cable 112, such that the first roller R1 is no longer engaged with the cable 112. However, in embodiments without the torsion spring 350, it will be less evident to the operator that the first roller R1 has become disengaged from the cable 112, because the lever 348 will not rotate as much about the lever axis 344.

The operator may then desire to perform a spin-only operation, and so rotates the mode selection plate 160 to the spin-only position, causing the roller R1, R2, R3 to rotate about the first, second, and third retainer axes 248, 252, 256 to a position in which the first second and third roller axes A1, A2, A3 are parallel to the cable axis 214. The operator may then move the lever 348 into the active position, and the cable 112 is caused to spin within the plumbing line by the rollers R1, R2, R3. The operator may then again depress the release actuator 368 to return the lever 348 to its inactive position, as described above.

The operator may then wish to remove the cable 112 from the plumbing line and so the operator rotates the mode selection plate 160 to the reverse-drive position, causing the roller R1, R2, R3 to rotate about the first, second, and third retainer axes 248, 252, 256 to a position in which the first, second, and third roller axes A1, A2, A3 are not parallel to cable axis 214, and are in a position to drive the cable 112 to be retracted into the front aperture 200. The operator may then move the lever 348 again into the active position, and the cable 112 is caused to be retracted into the drum unit 108 by the rollers R1, R2, R3. The operator may then again depress the release actuator 368 to return the lever 348 to its inactive position.

Figure 19:
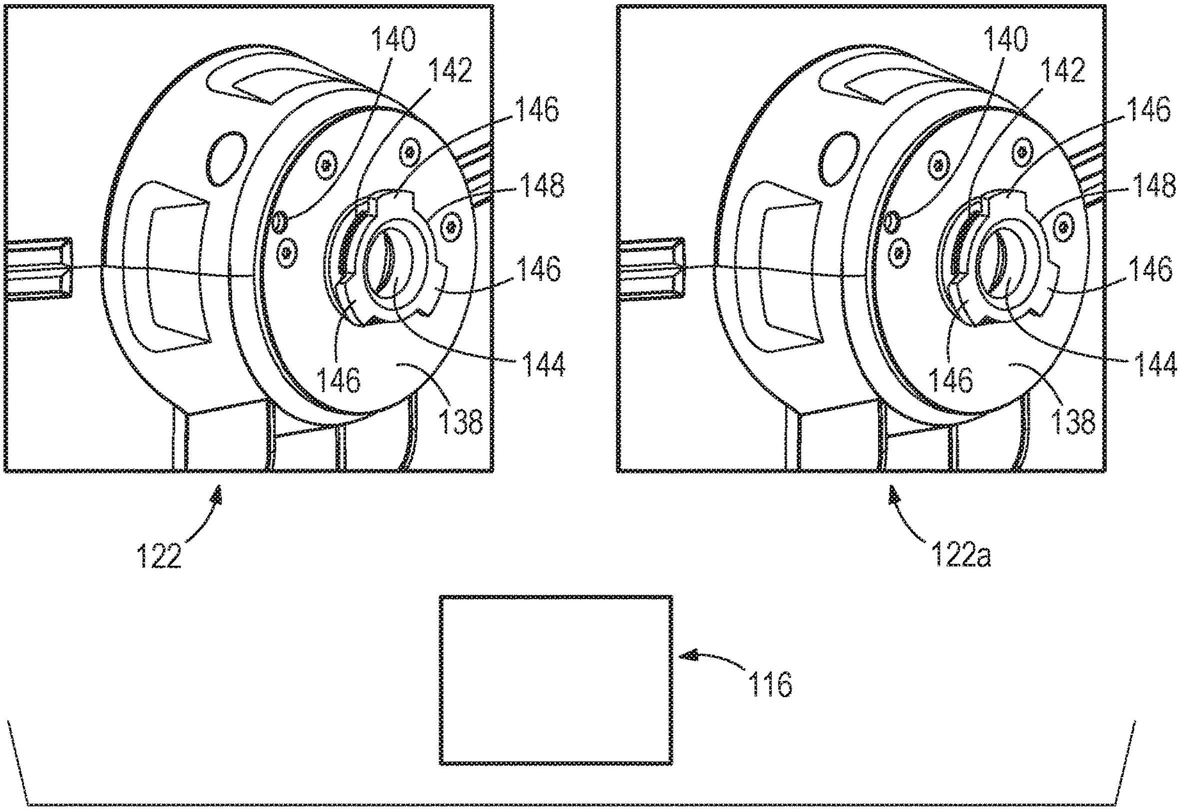
FIG. 19 is a schematic illustration of a system including the feed mechanism of FIG. 6 for use with a first drain cleaner and a second drain cleaner.

As shown schematically in FIG. 19, in addition to the first drain cleaner 122, the feed mechanism 116 is also configured to be used with a second drain cleaner 122*a* that is the same as or different from the first drain cleaner 122. However, both the first and second drain cleaners 122, 122*a* include the mounting plate 138 with lock aperture 140, extension 142 including opening 144, and the plurality of tangs 146 extending radially outward from the end 148 of the extension 142. Thus, after the operator is finished using the feed mechanism 116 with the first drain cleaner 122, the operator may conveniently remove the feed mechanism 116 and attach it to the second drain cleaner 122*a* for use with the second drain cleaner 122*a*. The feed mechanism 116 is coupled to the second drain cleaner 122*a* in the same manner as it is coupled to the first drain cleaner 122, which is described above.

Figure 20:
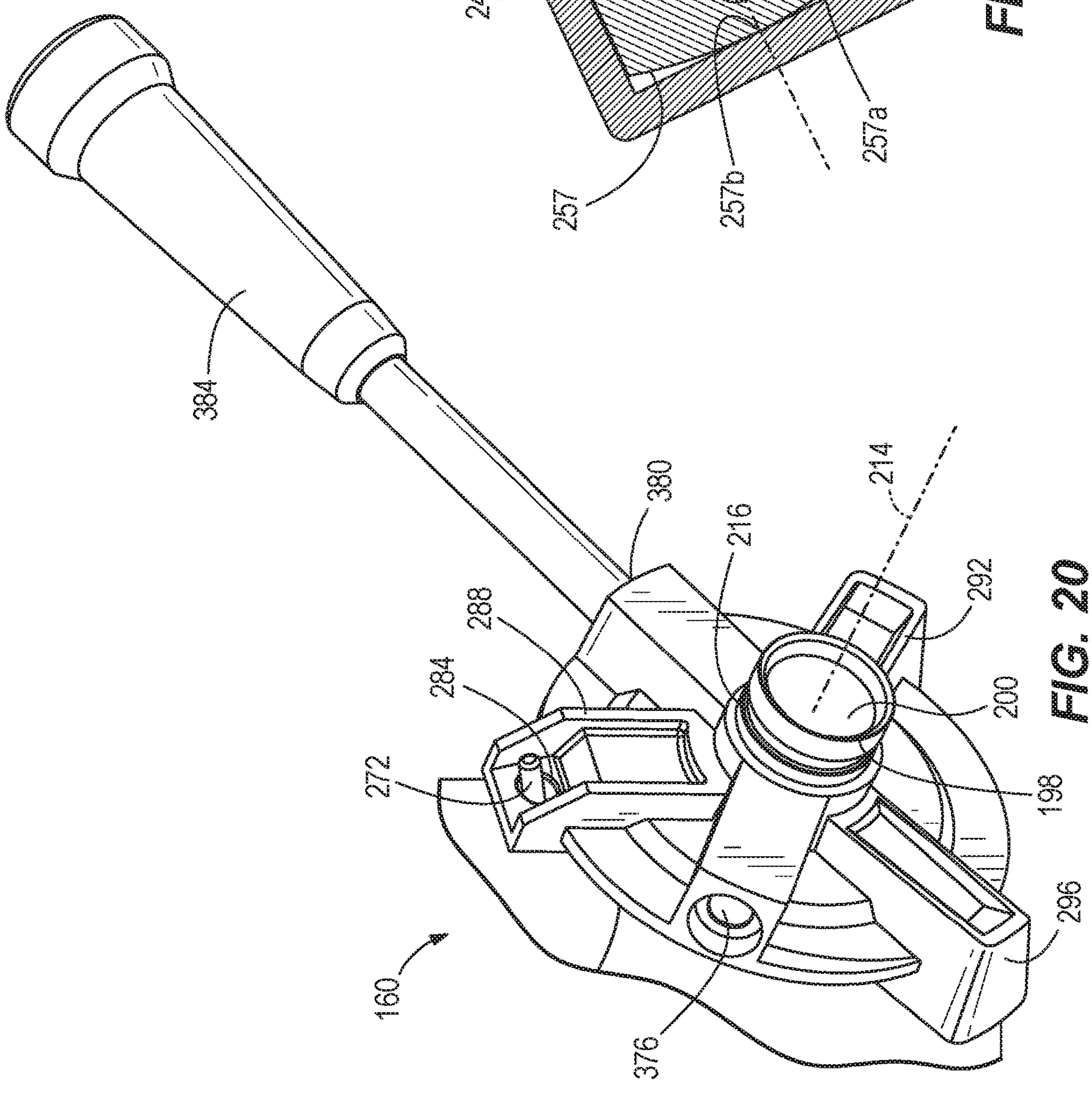
FIG. 20 is a perspective view of a mode selection plate of the feed mechanism of FIG. 6, according to another embodiment of the invention.

In some embodiments, as shown in FIG. 20, the mode selection plate 160 includes a first attachment point, such as first recess 376, and a second attachment point, such as second recess 380. The feed mechanism 116 includes a mode selection lever 384 that is removable receivable into either of the first or second recesses 376, 380. In the embodiment illustrated in FIG. 20, the first and second attachment points are first and second recesses 376, 380 into which the mode selection lever 384 is received, but in other embodiments, the first and second attachment points could be bosses or protrusions, and the mode selection lever 384 could have a recess enabling the mode selection 384 to be coupled to the bosses or protrusions.

In FIG. 20, the mode selection lever 384 is shown as being inserted into the second recess 380. Thus, depending on whether the operator is right or left handed, the operator may insert the mode selection lever 384 into the first or second recess 376, 380, making the feed mechanism 116 equally convenient to operate regardless of whether the operator is right or left handed. Once inserted into one of the first or second recesses 376, 380, the operator can use the mode selection lever 384 to rotate the mode selection plate 160 about the cable axis 214 to switch the mode selection plate 160 between the first, second or third positions.

Various features of the invention are set forth in the following claims.

What is claimed is:

1. A feed mechanism for use with a drain cleaner, the feed mechanism configured to drive a cable of the drain cleaner, the feed mechanism comprising:
- a frame configured to be coupled to the drain cleaner, the frame including a cable passage defining a cable axis;
- a plurality of rollers including a translatable roller, each roller defining a roller axis, the translatable roller moveable between an engaged position, in which the translatable roller is moved toward the cable axis to engage the cable, and a disengaged position, in which the translatable roller is moved away from the cable axis to be spaced from the cable;

a mode selection member coupled to the frame and moveable between a first position in which each roller axis is parallel to the cable axis and the plurality of rollers are configured to spin the cable about the cable axis, and a second position in which each roller axis is non-parallel to the cable axis and the plurality of rollers are configured to move the cable in a first direction along the cable axis, wherein when the translatable roller is in the engaged position and the mode selection member is in the first position, the feed mechanism is operable to spin the cable about the cable axis, wherein when the translatable roller is in the engaged position and the mode selection member is in the second position, the feed mechanism is operable to move the cable in the first direction along the cable axis;

a lever configured to pivot between an active position, in which the translatable roller is in the engaged position, and an inactive position in which the translatable roller is in the disengaged position; and a plurality of sleeves, each sleeve having a slot and containing a roller retainer that respectively holds one of the plurality of rollers, each roller retainer having a pin respectively extending through the slot of the sleeve containing the roller retainer, each roller retainer defining a retainer axis, and wherein the roller retainer holding the translatable roller is a translatable roller retainer;

wherein the mode selection member engages each of the pins, such that in response to movement of the mode selection member between the first and second positions, each pin is respectively rotated about its respective retainer axis within the slot through which the pin extends, such that each roller retainer is rotated about its respective retainer axis;

wherein at least one of the roller retainers that is not the translatable roller retainer includes a rounded bottom that engages a bottom of the sleeve in which the roller retainer is arranged.

2. The feed mechanism of claim 1, wherein the mode selection member is moveable to a third position in which each roller axis is non-parallel to the cable axis and the plurality of rollers are configured to move the cable in a second direction along the cable axis that is opposite the first direction.

3. The feed mechanism of claim 1, wherein the mode selection member is rotatable about the cable axis between the first and second positions.

4. The feed mechanism of claim 3, further comprising a mode selection lever, and wherein the mode selection member includes a first attachment point configured to removably receive the mode selection lever, such that when the mode selection member is on the first attachment point, the mode selection lever can be used to rotate the mode selection member between the first and second positions.

5. The feed mechanism of claim 4, wherein the mode selection member includes a second attachment point configured to removably receive the mode selection lever, such that when the mode selection member is on the second attachment point, the mode selection lever can be used to rotate the mode selection member between the first and second positions.

6. The feed mechanism of claim 1, wherein when the lever pivots from the inactive position to the active position, the lever pivots toward the drain cleaner.

7. The feed mechanism of claim 1, wherein the translatable roller retainer is translatable in its respective sleeve in response to movement of the lever between the active and inactive positions.

8. The feed mechanism of claim 7, wherein the pin of the translatable roller retainer is coupled to the translatable roller retainer via a hinge joint, such that in response to the translatable roller retainer translating within its respective sleeve, the pin of the translatable roller retainer is able to pivot within the slot through which it extends.

9. The feed mechanism of claim 8, wherein the pin of the translatable roller retainer is configured to rotate about the retainer axis of the translatable roller retainer along a first plane in response to the mode selection member moving between the first and second positions, and wherein the pin of the translatable roller retainer is configured to pivot along a second plane that is perpendicular to a first plane in response to the translatable roller retainer translating within its respective sleeve.

10. The feed mechanism of claim 1, wherein each of the plurality of sleeves and each of the plurality of roller retainers are formed of aluminum.

11. The feed mechanism of claim 1, wherein a graphite based grease is respectively applied between each sleeve and the roller retainer that it contains.

12. The feed mechanism of claim 1, wherein the each of the roller retainers is hard coat anodized.

13. The feed mechanism of claim 1, wherein when the translatable roller is in the engaged position and the mode selection member is in the second position, the feed mechanism is operable to move the cable in the first direction along the cable axis at a maximum speed.

14. The feed mechanism of claim 13, wherein when the translatable roller is in the engaged position and the mode selection member is in a position between the first and second positions, the feed mechanism is operable to move the cable in the first direction along the cable axis at a speed that is less than the maximum speed.

15. The feed mechanism of claim 1, wherein the rounded bottom engages the bottom of the sleeve at a single point of contact.

16. The feed mechanism of claim 15, wherein the single point of contact is intersected by a roller retainer axis that is defined by the roller retainer having the rounded bottom.

17. The feed mechanism of claim 1, wherein the each of the rollers is selected from a group consisting of a bushing with a bearing pressed into the bushing, a pair of adjacent bearings, and a bushing.

18. A feed mechanism for use with a drain cleaner, the feed mechanism configured to drive a cable of the drain cleaner, the feed mechanism comprising:

a frame configured to be coupled to the drain cleaner, the frame including a cable passage defining a cable axis;

a plurality of rollers including a translatable roller, each roller defining a roller axis, the translatable roller moveable between an engaged position, in which the translatable roller is moved toward the cable axis to engage the cable, and a disengaged position, in which the translatable roller is moved away from the cable axis to be spaced from the cable;

a mode selection member coupled to the frame and moveable between a first position in which each roller axis is parallel to the cable axis and the plurality of rollers are configured to spin the cable about the cable axis, and a second position in which each roller axis is non-parallel to the cable axis and the plurality of rollers are configured to move the cable in a first direction along the cable axis, wherein when the translatable roller is in the engaged position and the mode selection member is in the first position, the feed mechanism is operable to spin the cable about the cable axis, and wherein when the translatable roller is in the engaged position and the mode selection member is in the second position, the feed mechanism is operable to move the cable in the first direction along the cable axis;

a lever configured to pivot between an active position, in which the translatable roller is in the engaged position, and an inactive position in which the translatable roller is in the disengaged position;

a plurality of sleeves, each sleeve having a slot and containing a roller retainer that respectively holds one of the plurality of rollers, each roller retainer having a pin respectively extending through the slot of the sleeve containing the roller retainer, each roller retainer defining a retainer axis, and wherein the roller retainer holding the translatable roller is a translatable roller retainer;

wherein the mode selection member engages each of the pins, such that in response to movement of the mode selection member between the first and second positions, each pin is respectively rotated about its respective retainer axis within the slot through which the pin extends, such that each roller retainer is rotated about its respective retainer axis;

a pivot arm coupled for rotation with the lever arm, the pivot arm having a slot;

a plunger having a cross pin arranged through the slot of the pivot arm, such that the plunger is configured to translate toward the cable axis in response to the lever moving from the inactive to the active position; and a cap coupled to the plunger and to the translatable roller retainer, such that the translatable roller retainer is configured to translate toward the cable axis in response to the plunger moving toward the cable axis.

19. The feed mechanism of claim 18, further comprising a compression spring arranged between the cap and the translatable roller retainer.

20. The feed mechanism of claim 18, further comprising a linkage member coupling the cap to the translatable roller retainer, the linkage member having a slot through which a cross-pin of the translatable roller retainer extends.

21. The feed mechanism of claim 18, further comprising a torsion spring biasing the lever to the inactive position.

22. The feed mechanism of claim 21, further comprising a friction plate engaged with the plunger, such that when the lever is moved to the active position, a sufficient friction between the friction plate and the plunger exists that the torsion spring is inhibited from moving the lever back to the inactive position.

23. The feed mechanism of claim 22, wherein the friction plate is one of a plurality of friction plates engaging the plunger.

24. The feed mechanism of claim 22, wherein a first end of the friction plate is biased by a first compression spring toward a release actuator, and wherein when the lever is moved to the active position and the friction plate is frictionally engaging the plunger, the release actuator is depressible to move the first end of the friction plate toward the first compression spring, such that friction plate releases the plunger and the lever is moved to the inactive position by the torsion spring.

25. The feed mechanism of claim 24, wherein an actuator cylinder is arranged between the release actuator and the first end of the friction plate.

26. The feed mechanism of claim 25, wherein response to depression of the release actuator, the actuator cylinder is moveable along a stem to move the first end of the friction plate toward the first compression spring.

27. The feed mechanism of claim 24, wherein a second end of the friction plate is biased by a second compression spring away from the cable axis.

28. A feed mechanism for use with a drain cleaner, the feed mechanism configured to drive a cable of the drain cleaner, the feed mechanism comprising:

a frame configured to be coupled to the drain cleaner, the frame including a cable passage defining a cable axis;

a plurality of rollers including a translatable roller, each roller defining a roller axis, the translatable roller moveable between an engaged position, in which the translatable roller is moved toward the cable axis to engage the cable, and a disengaged position, in which the translatable roller is moved away from the cable axis to be spaced from the cable;

a mode selection member coupled to the frame and moveable between a first position in which each roller axis is parallel to the cable axis and the plurality of rollers are configured to spin the cable about the cable axis, and a second position in which each roller axis is non-parallel to the cable axis and the plurality of rollers are configured to move the cable in a first direction along the cable axis, wherein when the translatable roller is in the engaged position and the mode selection member is in the first position, the feed mechanism is operable to spin the cable about the cable axis;

wherein when the translatable roller is in the engaged position and the mode selection member is in the second position, the feed mechanism is operable to move the cable in the first direction along the cable axis;

wherein the mode selection member is rotatable about the cable axis between the first and second positions; and a mode selection lever, and wherein the mode selection member includes a first attachment point configured to removably receive the mode selection lever, such that when the mode selection member is on the first attachment point, the mode selection lever can be used to rotate the mode selection member between the first and second positions;

wherein the mode selection member includes a second attachment point configured to removably receive the mode selection lever, such that when the mode selection member is on the second attachment point, the mode selection lever can be used to rotate the mode selection member between the first and second positions.

29. A feed mechanism for use with a drain cleaner, the feed mechanism configured to drive a cable of the drain cleaner, the feed mechanism comprising:

a frame configured to be coupled to the drain cleaner, the frame including a cable passage defining a cable axis;

a plurality of rollers including a translatable roller, each roller defining a roller axis, the translatable roller moveable between an engaged position, in which the translatable roller is moved toward the cable axis to engage the cable, and a disengaged position, in which the translatable roller is moved away from the cable axis to be spaced from the cable;

a mode selection member coupled to the frame and moveable between a first position in which each roller axis is parallel to the cable axis and the plurality of rollers are configured to spin the cable about the cable axis, and a second position in which each roller axis is non-parallel to the cable axis and the plurality of rollers are configured to move the cable in a first direction along the cable axis, wherein when the translatable roller is in the engaged position and the mode selection member is in the first position, the feed mechanism is operable to spin the cable about the cable axis;

wherein when the translatable roller is in the engaged position and the mode selection member is in the second position, the feed mechanism is operable to move the cable in the first direction along the cable axis;

a lever configured to pivot between an active position, in which the translatable roller is in the engaged position, and an inactive position in which the translatable roller is in the disengaged position; and a plurality of sleeves, each sleeve having a slot and containing a roller retainer that respectively holds one of the plurality of rollers, each roller retainer having a pin respectively extending through the slot of the sleeve containing the roller retainer, each roller retainer defining a retainer axis, and wherein the roller retainer holding the translatable roller is a translatable roller retainer;

wherein the mode selection member engages each of the pins, such that in response to movement of the mode selection member between the first and second positions, each pin is respectively rotated about its respective retainer axis within the slot through which the pin extends, such that each roller retainer is rotated about its respective retainer axis;

wherein the translatable roller retainer is translatable in its respective sleeve in response to movement of the lever between the active and inactive positions;

wherein the pin of the translatable roller retainer is coupled to the translatable roller retainer via a hinge joint, such that in response to the translatable roller retainer translating within its respective sleeve, the pin of the translatable roller retainer is able to pivot within the slot through which it extends.

30. The feed mechanism of claim 29, wherein the pin of the translatable roller retainer is configured to rotate about the retainer axis of the translatable roller retainer along a first plane in response to the mode selection member moving between the first and second positions, and wherein the pin of the translatable roller retainer is configured to pivot along a second plane that is perpendicular to a first plane in response to the translatable roller retainer translating within its respective sleeve.

* * * * *